US012608826B2

(12) United States Patent
Chande et al.

(10) Patent No.: US 12,608,826 B2
(45) Date of Patent: Apr. 21, 2026

(54) VIEWPOINT PATH MODELING

(71) Applicant: Fyusion, Inc., San Francisco, CA (US)

(72) Inventors: Krunal Ketan Chande, San Francisco, CA (US); Stefan Johannes Josef Holzer, San Mateo, CA (US); Wook Yeon Hwang, San Francisco, CA (US); Alexander Jay Bruen Trevor, San Francisco, CA (US); Shane Griffith, San Diego, CA (US)

(73) Assignee: Fyusion, Inc., San Francisco, CA (US)

( * ) Notice: Subject to any disclaimer, the term of this patent is extended or adjusted under 35 U.S.C. 154(b) by 175 days.

(21) Appl. No.: 17/351,104

(22) Filed: Jun. 17, 2021

(65) Prior Publication Data

US 2022/0408019 A1 Dec. 22, 2022

(51) Int. Cl.
| | |
|---|---|
| *G06T 7/30* | (2017.01) |
| *G01B 11/03* | (2006.01) |
| *G06T 7/20* | (2017.01) |
| *G06T 7/32* | (2017.01) |
| *H04N 23/60* | (2023.01) |

(Continued)

(52) U.S. Cl.
CPC ............... *G06T 7/30* (2017.01); *G01B 11/03* (2013.01); *G06T 7/20* (2013.01); *G06T 7/32* (2017.01); *H04N 23/64* (2023.01); *H04N 23/68* (2023.01); *H04N 23/698* (2023.01); *G06T 5/70* (2024.01);

(Continued)

(58) Field of Classification Search
CPC .... H04N 23/681; H04N 23/6811; G06T 7/70; G06T 7/20; G06T 3/00; G06T 3/0006;

G06T 3/0043; G06T 3/0062; G06T 3/0093; G06T 7/30; G06T 7/32; G06T 7/33;

(Continued)

(56) References Cited

U.S. PATENT DOCUMENTS

| | | |
|---|---|---|
| 5,850,352 A | 12/1998 | Moezzi |
| 8,073,190 B2 | 12/2011 | Gloudemans |

(Continued)

FOREIGN PATENT DOCUMENTS

| | | |
|---|---|---|
| CN | 108648215 A | 10/2018 |
| CN | 112598757 B | 6/2021 |

(Continued)

OTHER PUBLICATIONS

Machine translation of WO 2019053790 A1 (Year: 2019).*

(Continued)

*Primary Examiner* — David N Werner
(74) *Attorney, Agent, or Firm* — Kwan & Olynick LLP

(57) ABSTRACT

A set of images may be captured by a camera as the camera moves along a path through space around an object. Then, a smoothed function (e.g., a polynomial) may be fitted to the translational and/or rotational position in space. For example, positions in a Cartesian coordinates pace may be determined for the images. The positions may then be transformed to a polar coordinate space, in which a trajectory along the points may be determined, and the trajectory transformed back into the Cartesian space. Similarly, the rotational position of the images may be smoothed, for instance by fitting a loss function. Finally, one or more images may be transformed to more closely align a viewpoint of the image with the fitted translational and/or rotational positions.

20 Claims, 19 Drawing Sheets

(51) Int. Cl.

| | |
|---|---|
| *H04N 23/68* | (2023.01) |
| *H04N 23/698* | (2023.01) |
| *G06T 5/70* | (2024.01) |
| *G06T 7/38* | (2017.01) |

(52) U.S. Cl.
CPC ...... *G06T 7/38* (2017.01); *G06T 2207/30241* (2013.01)

(58) Field of Classification Search
CPC ........... G06T 7/337; G06T 7/344; G06T 7/35; G06T 7/38
See application file for complete search history.

(56) References Cited

U.S. PATENT DOCUMENTS

| | | | | |
|---|---|---|---|---|
| 8,736,672 | B2 | 5/2014 | Lipton | |
| 8,922,628 | B2 | 12/2014 | Bond | |
| 9,446,523 | B2 | 9/2016 | Linnell | |
| 10,341,562 | B1* | 7/2019 | Cotoros | G06T 5/002 |
| 2003/0043270 | A1 | 3/2003 | Rafey | |
| 2005/0129325 | A1 | 6/2005 | Wu | |
| 2007/0031063 | A1* | 2/2007 | Zhou | G06V 10/24 |
| | | | | 382/284 |
| 2007/0127795 | A1* | 6/2007 | Lau | G06F 16/51 |
| | | | | 600/401 |
| 2008/0107323 | A1* | 5/2008 | Ratner | G06T 7/30 |
| | | | | 382/132 |
| 2008/0218594 | A1* | 9/2008 | Gural | H04N 23/68 |
| | | | | 382/294 |
| 2010/0302347 | A1 | 12/2010 | Shikata | |
| 2010/0321509 | A1* | 12/2010 | Torii | H04N 23/6811 |
| | | | | 348/208.4 |
| 2011/0141298 | A1* | 6/2011 | Nishiyama | H04N 23/6811 |
| | | | | 348/208.99 |
| 2011/0157017 | A1* | 6/2011 | Webb | G06F 3/0317 |
| | | | | 345/158 |
| 2012/0105578 | A1 | 5/2012 | Ohmiya | |
| 2012/0327220 | A1* | 12/2012 | Ma | G06T 7/292 |
| | | | | 348/135 |
| 2013/0050516 | A1* | 2/2013 | Hojo | H04N 23/6811 |
| | | | | 348/208.6 |
| 2013/0129192 | A1* | 5/2013 | Wang | H04N 13/111 |
| | | | | 382/154 |
| 2013/0314410 | A1 | 11/2013 | Gravois et al. | |
| 2014/0212031 | A1 | 7/2014 | Tytgat et al. | |
| 2015/0009277 | A1 | 1/2015 | Kuster et al. | |
| 2015/0022678 | A1* | 1/2015 | Tsubaki | H04N 23/687 |
| | | | | 348/208.5 |
| 2015/0153444 | A1 | 6/2015 | Nichols | |
| 2015/0169979 | A1 | 6/2015 | Ko | |
| 2015/0243035 | A1* | 8/2015 | Narasimha | G06T 7/344 |
| | | | | 382/154 |
| 2016/0140695 | A1* | 5/2016 | Yuan | H04N 23/683 |
| | | | | 382/103 |
| 2016/0262521 | A1* | 9/2016 | Kustra | G06T 7/74 |
| 2016/0381341 | A1 | 12/2016 | El Choubassi | |
| 2017/0026574 | A1 | 1/2017 | Kwon | |
| 2017/0140530 | A1* | 5/2017 | Jiang | G06T 7/0016 |
| 2017/0345158 | A1* | 11/2017 | Xu | G06T 7/38 |
| 2018/0005377 | A1* | 1/2018 | Alvarez | G06T 7/74 |
| 2018/0018787 | A1 | 1/2018 | Giancola et al. | |
| 2018/0081995 | A1 | 3/2018 | Horhammer et al. | |
| 2018/0096451 | A1 | 4/2018 | Misra et al. | |
| 2018/0295270 | A1* | 10/2018 | Oshima | H04N 23/6811 |
| 2019/0035099 | A1* | 1/2019 | Ebrahimi Afrouzi | G06N 3/008 |
| 2019/0073802 | A1* | 3/2019 | Case | G06T 11/005 |
| 2019/0158746 | A1* | 5/2019 | Besley | G06T 5/50 |
| 2019/0266779 | A1* | 8/2019 | Kulkarni | G06T 7/20 |
| 2019/0306420 | A1* | 10/2019 | Okaki | G06T 7/33 |
| 2019/0313085 | A1* | 10/2019 | Trevor | H04N 13/271 |
| 2020/0016056 | A1* | 1/2020 | Stafford | A61K 8/362 |
| 2020/0226721 | A1* | 7/2020 | Kishimoto | G01S 15/8977 |
| 2020/0228774 | A1 | 7/2020 | Kar | |

| | | | | |
|---|---|---|---|---|
| 2020/0234398 | A1 | 7/2020 | Holzer et al. | |
| 2020/0280685 | A1 | 9/2020 | Chen | |
| 2020/0314407 | A1 | 10/2020 | Otsuka | |
| 2021/0110560 | A1 | 4/2021 | Knorr | |
| 2021/0142251 | A1 | 5/2021 | Sasaki | |
| 2021/0142511 | A1 | 5/2021 | Jeong | |
| 2021/0319606 | A1* | 10/2021 | Gupta | G06T 11/60 |
| 2021/0326608 | A1* | 10/2021 | Yoshimi | G06V 20/58 |
| 2021/0353244 | A1* | 11/2021 | Kiely | A61N 5/1037 |
| 2022/0014723 | A1 | 1/2022 | Pandey | |
| 2022/0075453 | A1 | 3/2022 | Huang | |
| 2022/0364851 | A1* | 11/2022 | Engman | G06T 7/0004 |
| 2022/0392157 | A1* | 12/2022 | Glira | G06T 7/70 |

FOREIGN PATENT DOCUMENTS

| | | | | |
|---|---|---|---|---|
| CN | 113159197 | A | 7/2021 | |
| CN | 111899307 | B * | 12/2023 | G06T 7/80 |
| EP | 3062515 | A1 | 8/2016 | |
| EP | 3321888 | A1 * | 5/2018 | G06F 3/01 |
| EP | 3333538 | A1 * | 6/2018 | H04N 23/698 |
| EP | 3929812 | B1 * | 5/2024 | G06V 10/44 |
| JP | 4817384 | B2 | 11/2011 | |
| WO | WO-2019053790 | A1 * | 3/2019 | G06T 3/00 |

OTHER PUBLICATIONS

James Stewart, Calculus: Early Transcendentals 661-62, 949 (4th Ed. 1999) (Year: 1999).*

R.A. Manning & C.R. Dyer, "Interpolating View and Scene Motion by Dynamic View Morphing", 1999 Proc. of IEEE Comp. Soc'y Conf. on Comp. Vision & Pattern Recognition 388-394 (Jun. 1999) (Year: 1999).*

D. Lee & J. Park, "Estimation of Camera Parameters from a Single Moving Camera using Quaternion-based Interpolation of 3D Trajectory", 2007 Int'l Conf. on Comp. Graphics, Imaging and Visualization 77-80 (Aug. 2007) (Year: 2007).*

L. Haalck & B. Risse, "Embedded Dense Camera Trajectories in Multi-Video Image Mosaics by Geodesic Interpolation-based Reintegration", 2021 IEEE Winter Conf. on Apps. of Comp. Vision 1848-1857 (Jan. 2021) (Year: 2021).*

A. Angeli, S. Doncieux, J.A. Meyer, & D. Filiat, "Real-Time Visual Loop-Closure Detection", 2008 IEEE Int'l Conf. on Robots & Automation 1842--47 (Sep. 2008) (Year: 2008).*

Q. Galvane, M. Christie, C. Lino, & R. Ronfard, "Camera-on-rails: Automated Computation of Constrained Camera Paths", 8 Proc. of Acm Siggraph Conf. on Motion in Games 151--157 (Nov. 16, 2015) (Year: 2015).*

A. Kendall & R. Cipolla, "Geometric loss functions for camera pose regression with deep learning", 2017 Proc. IEEE Conf. on Computer Vision & Pattern Recognition 5974--5983 (Jul. 2017) (Year: 2017).*

S. Liu, L. Yuan, P. Tan, & J. Sun, "Bundled Camera Paths for Video Stabilization", 32 ACM Transactions on Graphics No. 4, Art. 78 (Jul. 2013) (Year: 2013).*

J. Sanchez & J.M. Morel, "Motion Smoothing Strategies for 2D Video Stabilization", 11 Siam J. on Imaging Sci. 219--251 (Jan. 2018) (Year: 2018).*

M.R. Souza & H. Pedrini, "Digital video stabilization based on adaptive camera trajectory smoothing", 2018 EURASIP J. on Image & Video Processing, Art. 37 (May 30, 2018) (Year: 2018).*

S. Van Der Jeught, P.G.G. Muyshondt, & I. Lobato, "Optimized loss function in deep learning profilometry for improved prediction performance", 3 J. Phys. Photonics, Art No. 024014 (Apr. 16, 2021) (Year: 2021).*

International Search Report and Written Opinion issued in App. No. PCT/US2022/072991, mailing date Oct. 5, 2022, 10 pages.

Office Action (Non-Final Rejection) dated Mar. 30, 2023 for U.S. Appl. No. 17/502,594 (pp. 1-14).

Office Action (Letter Restarting Period for Response (i.e. Letter re: References)) dated Jun. 21, 2023 for U.S. Appl. No. 17/502,594 (pp. 1-15).

Office Action (Final Rejection) dated Oct. 31, 2023 for U.S. Appl. No. 17/502,594 (pp. 1-13).

(56)                    References Cited

OTHER PUBLICATIONS

International Preliminary Report on Patentability issued in App. No. PCT/US2022/072991, mailing date Dec. 28, 2023, 7 pages.
Office Action (Non-Final Rejection) dated Feb. 7, 2024 for U.S. Appl. No. 17/502,594 (pp. 1-12).
Office Action (Final Rejection) dated Dec. 4, 2024 for U.S. Appl. No. 17/502,594 (pp. 1-13).
Office Action (Non-Final Rejection) dated Mar. 24, 2025 for U.S. Appl. No. 17/502,594 (pp. 1-13).
D.S.G. Pollock, "Smoothing with Cubic Splines", in Handbook of Time Series Analysis, Signal Processing, and Dynamics 293-322 (1999) (Year: 1999).
U.S. Appl. No. 17/502,594, USPTO e-Office Action: CTFR—Final Rejection, Nov. 13, 2025, 7 pages.
U.S. Appl. No. 17/502,594, USPTO e-Office Action: CTNF—Non-Final Rejection, Jan. 30, 2026, 14 pages.

* cited by examiner

MVIDMR
Acquisition System
*600*

Distant Scenery *1026*

Camera Location *1028*

Camera Location *1030*

Convex View *1020*

Object of Interest *1024*

Camera Location *1032*

Object of Interest *1004*

Camera Location *1002*

Concave View *1000*

Distant Scenery *1006*

Axis *1008*

VIEWPOINT PATH MODELING

TECHNICAL FIELD

The present disclosure relates generally to the processing of image data.

DESCRIPTION OF RELATED ART

Images are frequently captured via a handheld device such as a mobile phone. For example, a user may capture images of an object such as a vehicle by walking around the object and capturing a sequence of images or a video. However, such image data is subject to significant distortions. For instance, the images may not be captured in an entirely closed loop, or the camera's path through space may include vertical movement in addition to the rotation around the object. To provide for enhanced presentation of the image data, improved techniques for viewpoint path modeling are desired.

OVERVIEW

According to various embodiments, techniques and mechanisms described herein provide for systems, devices, methods, and machine readable media for the collection and processing of image data.

In some implementations, a plurality of first coordinate points associated with a first set of images captured by a mobile computing device as the mobile computing device moved along a path through space may be determined. Each of the first coordinate points may identify a respective location in Cartesian coordinate space. The plurality of first coordinate points may be converted to second coordinate points. Each of the second coordinate points may identify a respective location in polar coordinate space. A first trajectory through the polar coordinate space may be determined based on the second coordinate points. The first trajectory through the polar coordinate space may be converted to a second trajectory through the Cartesian coordinate space. A second set of images may be determined based on the first set of images and the second trajectory. One or more of the second set of images may be determined by transforming one or more of the first set of images to match a respective viewpoint associated with the second trajectory.

According to various embodiments, each of the first coordinate points may correspond to a respective position of the mobile computing device along the path through space. The plurality of first coordinate points may be determined at least in part via motion data captured from an inertial measurement unit at the mobile computing device. The motion data may include data such as accelerometer data, gyroscopic data, and/or global positioning system (GPS) data. The plurality of first coordinate points may be determined at least in part via depth sensor data captured from a depth sensor at the mobile computing device.

According to various embodiments, a multiview interactive digital media representation (MVIDMR) may be generated that includes the second set of images. The MVIDMR may be navigable in one or more dimensions. Each of the first set of images may include an object, and the path through space may move around the object. The object may be a vehicle, and the mobile computing device may be a mobile phone. The path through space may involve a 360-degree rotation around the object.

In some embodiments, determining the first trajectory may involve fitting a polynomial curve. Determining the first trajectory may involve enforcing loop closure by determining a set of projected locations for virtual data points. The projected locations may link a beginning portion of the path through space with an ending portion of the path through space.

BRIEF DESCRIPTION OF THE DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

Techniques and mechanisms described herein provide for viewpoint path modeling and image transformation. A set of images may be captured by a camera as the camera moves along a path through space around an object. Then, a smoothed function (e.g., a polynomial) may be fitted to the translational and/or rotational motion in space. For example, positions in a Cartesian coordinates pace may be determined for the images. The positions may then be transformed to a polar coordinate space, in which a trajectory along the points may be determined, and the trajectory transformed back into the Cartesian space. Similarly, the rotational motion of the images may be smoothed, for instance by fitting a loss function. Finally, one or more images may be transformed to more closely align a viewpoint of the image with the fitted translational and/or rotational positions.

According to various embodiments, images are often captured by handheld cameras, such as cameras on a mobile phone. For instance, a camera may capture a sequence of images of an object as the camera moves along a path around the object. However, such image sequences are subject to considerable noise and variation. For example, the camera may move vertically as it traverses the path. As another example, the camera may traverse a 360-degree path around the object but end the path at a position nearer to or further away from the object than at the beginning of the path.

Figure 1:
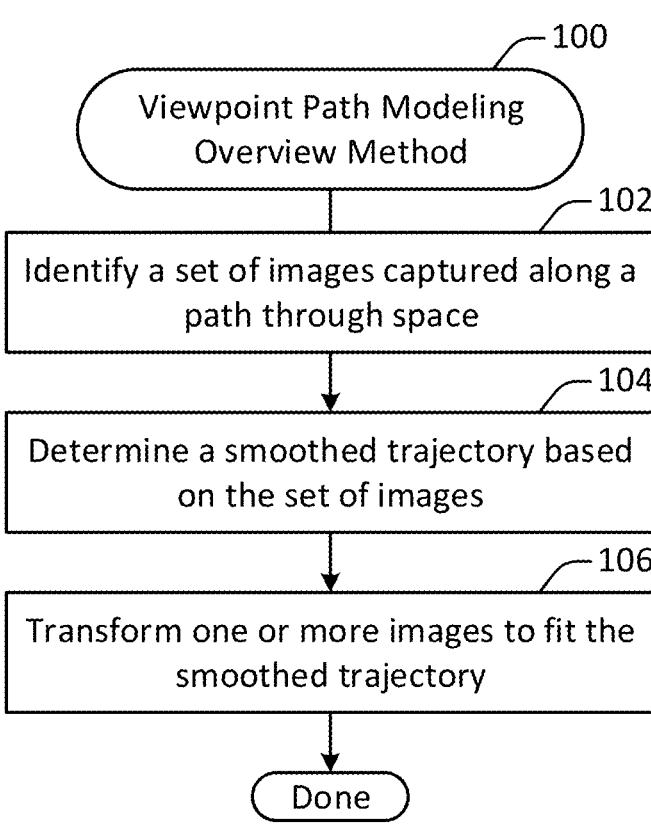
FIG. 1 illustrates an overview method for viewpoint path modeling, performed in accordance with one or more embodiments.

FIG. 1 illustrates an overview method 100 for viewpoint path modeling, performed in accordance with one or more embodiments. According to various embodiments, the method 100 may be performed on a mobile computing device that captures images along a path. Alternatively, the method 100 may be performed on a different computing device, such as a remote server to which data from a mobile computing device is transmitted.

A set of images captured along a path through space is identified at 102. According to various embodiments, the images may be captured by a mobile computing device such as a digital camera or a mobile phone. The images may be still images or frames extracted from a video.

In some embodiments, additional data may be captured by the mobile computing device beyond the image data. For example, motion data from an inertial measurement unit may be captured. As another example, depth sensor data from one or more depth sensors located at the mobile computing device may be captured.

A smoothed trajectory is determined at 104 based on the set of images. According to various embodiments, determining the smoothed trajectory may involve determining a trajectory for the translational position of the images. For example, the smoothed trajectory may be determined by identifying Cartesian coordinates for the images in a Cartesian coordinate space, and then transforming those coordinates to a polar coordinate space. A smoothed trajectory may then be determined in the polar coordinate space, and finally transformed back to a Cartesian coordinate space. Additional details regarding trajectory modeling are discussed throughout the application, and particularly with respect to the method 300 shown in FIG. 3.

In some implementations, determining the smoothed trajectory may involve determining a trajectory for the rotational position of the images. For example, a loss function including parameters such as the change in rotational position from an original image and/or a previous image may be specified. Updated rotational positions may then be determined by minimizing the loss function. Additional details regarding rotational position modeling are discussed throughout the application, and particularly with respect to the method 500 shown in FIG. 5.

One or more images are transformed at 106 to fit the smoothed trajectory. According to various embodiments, images captured from locations that are not along the smoothed trajectory may be altered by any of a variety of techniques so that the transformed images appear to be captured from positions closer to the smoothed trajectory. Additional details regarding image transformation are discussed throughout the application, and more specifically with respect to the method 500 shown in FIG. 5.

Figure 2A:
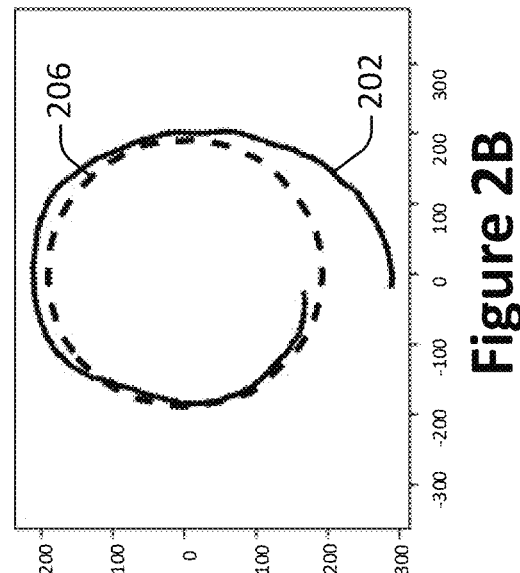
FIGS. 2A, 2B, and 2C illustrate examples of viewpoint path modeling diagrams, generated in accordance with one or more embodiments.
Figure 2B:
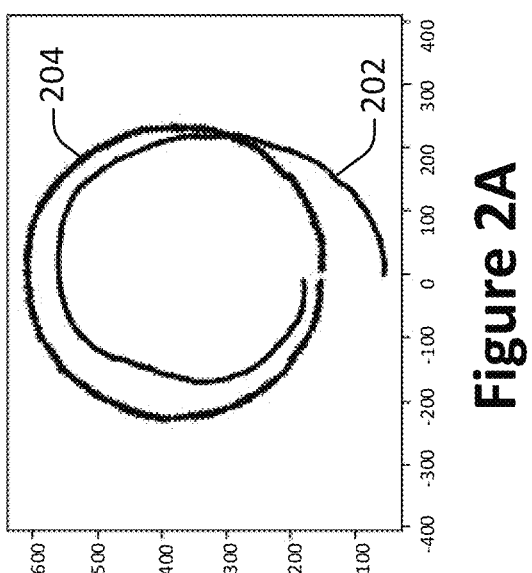
Figure 2C:
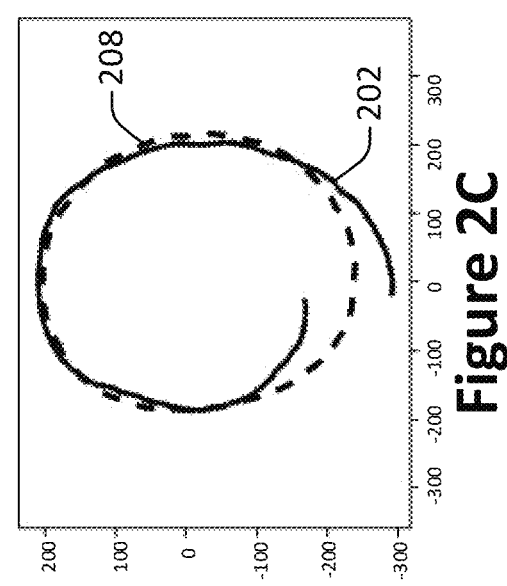

FIGS. 2A, 2B, and 2C illustrate examples of viewpoint path modeling diagrams, generated in accordance with one or more embodiments. In FIG. 2A, the points 202 show top-down Cartesian coordinates associated with images captured along a path through space. The points 204 show a trajectory fitted to the points as a circle using conventional trajectory modeling techniques. Because the fitted trajectory is circular, it necessarily is located relatively far from many of the points 202.

FIG. 2B shows a trajectory 206 fitted in accordance with techniques and mechanisms described herein. The trajectory 206 is fitted using a 1st order polynomial function after transformation to coordinate space, and then projected back into Cartesian coordinate space. Because a better center point is chosen, the trajectory 206 provides a better fit for the points 202.

FIG. 2C shows a trajectory 206 fitted in accordance with techniques and mechanisms described herein. The trajectory 206 is fitted using a 6th order polynomial function after transformation to coordinate space, and then projected back into Cartesian coordinate space. Because the circular constraint is relaxed and the points 202 fitted with a higher order polynomial, the trajectory 208 provides an even better better fit for the points 202.

Figure 3:
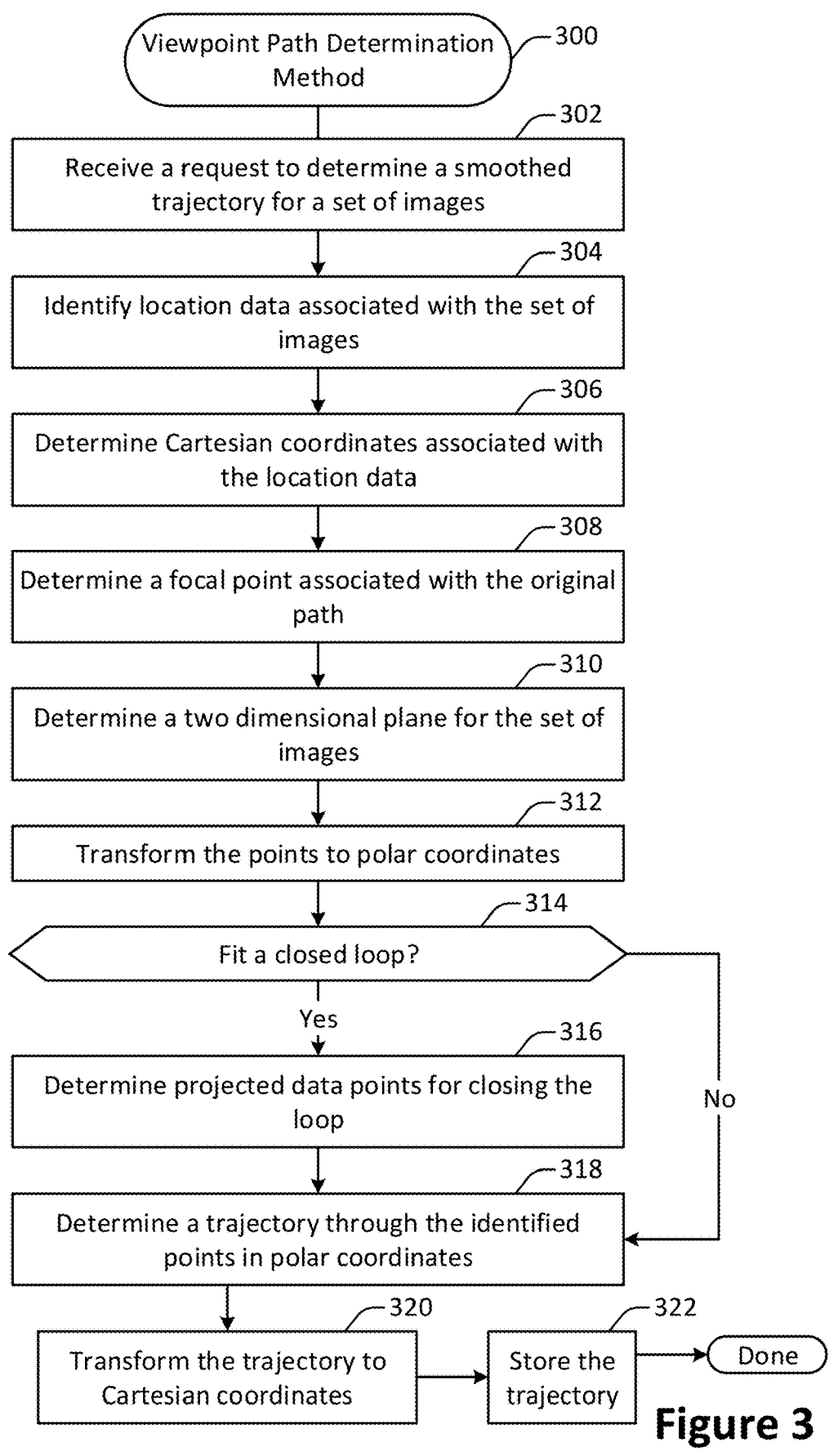
FIG. 3 illustrates one example of a method for translational viewpoint path determination, performed in accordance with one or more embodiments.
Figure 4B:
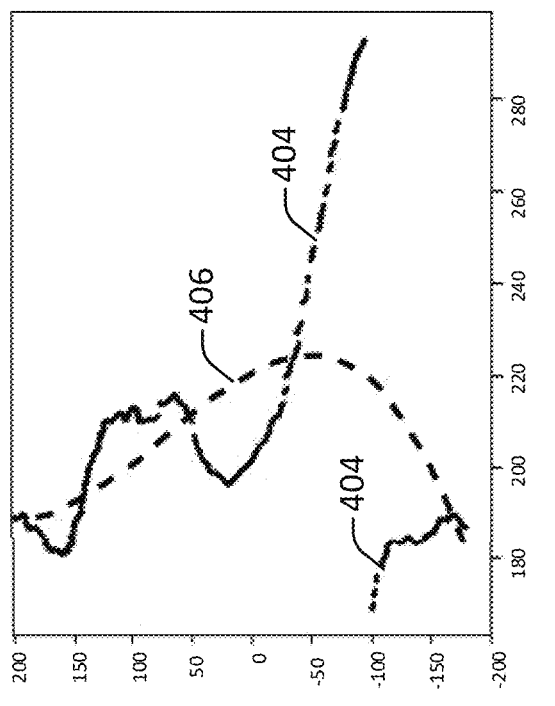
FIGS. 4A and 4B illustrate examples of viewpoint path modeling diagrams, generated in accordance with one or more embodiments.

FIG. 3 illustrates one example of a method 300 for viewpoint path determination, performed in accordance with one or more embodiments. According to various embodiments, the method 300 may be performed on a mobile computing device that captures images along a path. Alternatively, the method 300 may be performed on a different computing device, such as a remote server to which data from a mobile computing device is transmitted. The method 300 will be explained partially in reference to FIGS. 4A and 4B, which illustrate examples of viewpoint path modeling diagrams generated in accordance with one or more embodiments.

A request to determine a smoothed trajectory for a set of images is received at 302. According to various embodiments, the request may be received as part of a procedure for generating a multiview interactive digital media representation (MVIDMR). Alternatively, the request may be generated independently. For instance, a user may provide user input indicating a desire to transform images to fit a smoothed trajectory.

In particular embodiments, the set of images may be selected from a larger group of images. For instance, images may be selected so as to be relatively uniformly spaced. Such selection may involve, for example, analyzing location or timing data associated with the collection of the images. As another example, such selection may be performed after operation 304 and/or operation 306.

Location data associated with the set of images is determined at 304. The location data is employed at 306 to determine Cartesian coordinates for the images. The Cartesian coordinates may identify, in a virtual Cartesian coordinate space, a location at which some or all of the images were captured. An example of a set of Cartesian coordinates is shown at 402 in FIG. 4A.

According to various embodiments, the location data may be determined by one or more of a variety of suitable techniques. In some embodiments, the contents of the images may be modeled to estimate a pose relative to an object for each of the images. Such modeling may be based on identifying tracking points that occur in successive images, for use in estimating a change in position of the camera between the successive images. From this modeling, an estimated location in Cartesian coordinate space may be determined.

In some embodiments, location data may be determined at least in part based on motion data. For instance, motion data such as data collected from an inertial measurement unit (IMU) located at the computing device may be used to estimate the locations at which various images were captured. Motion data may include, but is not limited to, data collected from an accelerometer, gyroscope, and/or global positioning system (GPS) unit. Motion data may be analyzed to estimate a relative change in position from one image to the next. For instance, gyroscopic data may be used to estimate rotational motion while accelerometer data may be used to estimate translation in Cartesian coordinate space.

In some embodiments, location data may be determined at least in part based on depth sensor information captured from a depth sensor located at the computing device. The depth sensor information may indicate, for a particular image, a distance from the depth sensor to one or more elements in the image. When the image includes an object, such as a vehicle, the depth sensor information may provide a distance from the camera to one or more portions of the vehicle. This information may be used to help determine the location at which the image was captured in Cartesian coordinate space.

In particular embodiments, the location data may be specified in up to six degrees of freedom. The camera may be located in three-dimensional space with a set of Cartesian coordinates. The camera may also be oriented with a set of rotational coordinates specifying one or more of pitch, yaw, and roll. In particular embodiments, the camera may be assumed to be located along a relatively stable vertical level as the camera moves along the path.

A focal point associated with the original path is determined at 308. According to various embodiments, the focal point may be identified as being close to the center of the arc or loop if the original path moves along an arc or loop. Alternatively, the focal point may be identified as being located as being at the center of an object, for instance if each or the majority of the images features the object.

According to various embodiments, any of a variety of techniques may be used to determine the focal point. For example, the focal point may be identified by averaging the locations in space associated with the set of images. As another example, the focal point may be determined by minimizing the sum of squares of the intersection of the axes extending from the camera perspectives associated with the images.

In particular embodiments, the focal point may be determined based on a sliding window. For instance, the focal point for a designated image may be determined by averaging the intersection of the axes for the designated image and other images proximate to the designated image.

In some implementations, the focal point may be determined by analyzing the location data associated with the images. For instance, the location and orientation associated with the images may be analyzed to estimate a central point at which different images are focused. Such a point may be identified based on, for instance, the approximate intersection of vectors extending from the identified locations along the direction the camera is estimated to be facing.

In particular embodiments, a focal point may be determined based on one or more inferences about user intent. For example, a deep learning or machine learning model may be trained to identify a user's intended focal point based on the input data.

In some embodiments, potentially more than one focal point may be used. For example, the focal direction of images captured as the camera moves around a relatively large object such as a vehicle may change along the path. In such a situation, a number of local focal points may be determined to reflect the local perspective along a particular portion of the path. As another example, a single path may move through space in a complex way, for instance capturing arcs of images around multiple objects. In such a situation, the path may be divided into portions, with different portions being assigned different focal points.

A two-dimensional plane for the set of images is determined at 310. According to various embodiments, the two-dimensional plan may be determined by fitting a plane to the Cartesian coordinates associated with the location data at 306. For instance, a sum of squares model may be used to fit such a plane.

The identified points are transformed from Cartesian coordinates to polar coordinates at 312. According to various embodiments, the transformation may involve determining for each of the points a distance from the relevant focal point and an angular value indicating a degree of rotation around the object. An example of locations that have been transformed to polar coordinates is shown at 404 in FIG. 4B.

A determination is made at 314 as to whether to fit a closed loop around the object. In some implementations, the determination may be made based at least in part on user input. For instance, a user may provide an indication as to whether to fit a closed loop. Alternatively, or additionally, the determination as to whether to fit a closed loop may be made at least in part automatically. For example, a closed loop may be fitted if the path is determined to end in a location near where it began. As another example, a closed loop may be fitted if it is determined that the path includes nearly 360-degrees or more of rotation around the object. As yet another example, a closed loop may be fitted if one portion of the path is determined to overlap or nearly overlap with an earlier portion of the same path.

If it is determined to fit a closed loop, the projected data points for closing the loop are determined at 316. According to various embodiments, the projected data points may be determined in any of a variety of ways. For example, points may be copied from the beginning of the loop to the end of the loop, with a constraint added that the smoothed trajectory pass through the added points. As another example, a set of additional points that lead from the endpoint of the path to the beginning point of the path may be added.

A trajectory through the identified points in polar coordinates is determined at 318. According to various embodiments, the trajectory may be determined by any of a variety of curve-fitting tools. For example, a polynomial curve of a designated order may be fit to the points. An example of a smoothed trajectory determined in polar coordinate space is shown at 406 in FIG. 4B.

In some embodiments, the order of a polynomial curve may be strategically determined based on characteristics such as computation resources, fitting time, and the location data. For instance, higher order polynomial curves may provide a better fit but require greater computational resources and/or fitting time.

In some implementations, the order of a polynomial curve may be determined automatically. For instance, the order may be increased until one or more threshold conditions are met. For example, the order may be increased until the change in the fitted curve between successive polynomial orders falls beneath a designated threshold value. As another example, the order may be increased until the time required to fit the polynomial curve exceeds a designated threshold.

Figure 4A:
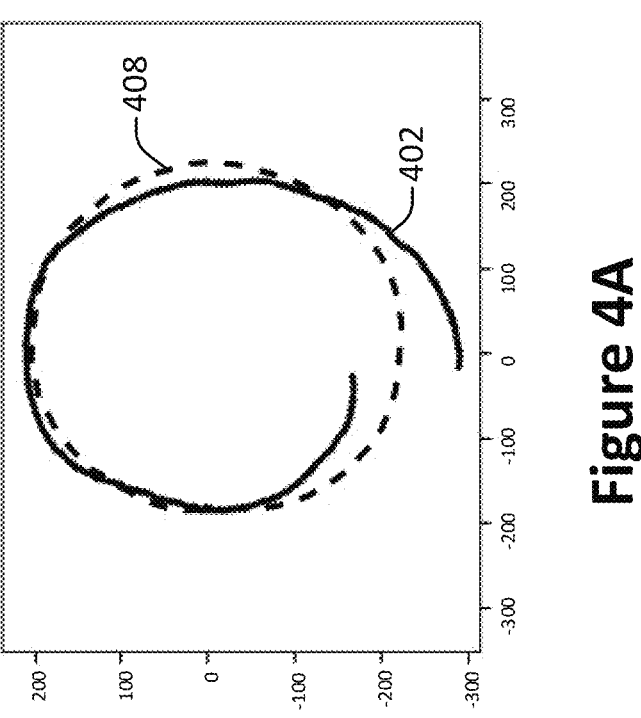

The smoothed trajectory in polar coordinate space is transformed to Cartesian coordinates at 320. According to various embodiments, the transformation performed at 320 may apply in reverse the same type of transformation performed at 312. Alternatively, a different type of transformation may be used. For example, numerical approximation may be used to determine a number of points along the smoothed trajectory in Cartesian coordinate space. As another example, the polynomial function itself may be analytically transformed from polar to Cartesian coordinates. Because the polynomial function, when transformed to Cartesian coordinate space, may have more than one y-axis value that corresponds with a designated x-axis value, the polynomial function may be transformed into a piecewise Cartesian coordinate space function. An example of a smoothed trajectory converted to Cartesian coordinate space is shown at 408 in FIG. 4A. In FIG. 4, a closed loop has been fitted by copying locations associated with images captured near the beginning of the path to virtual data points located near the end of the path, with a constraint that the curve start and end at these points.

The trajectory is stored at 322. According to various embodiments, storing the trajectory may involve storing one or more values in a storage unit on the computing device. Alternatively, or additionally, the trajectory may be stored in memory. In either case, the stored trajectory may be used to perform image transformation, as discussed in additional detail with respect to the method 1900 shown in FIG. 19.

Figure 18B:
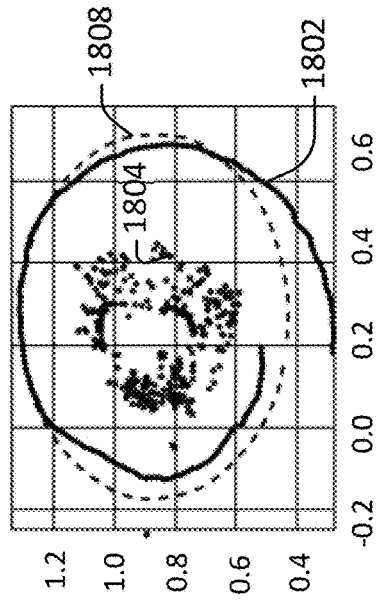
FIGS. 18A, 18B, 18C, and 18D illustrate examples of viewpoint path modeling diagrams, generated in accordance with one or more embodiments.
Figure 18D:
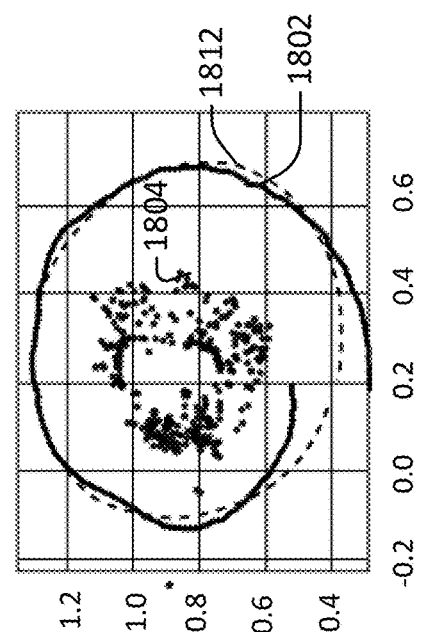
Figure 18A:
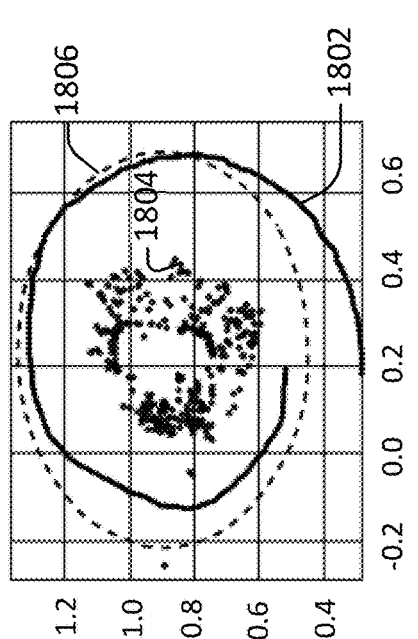
Figure 18A:
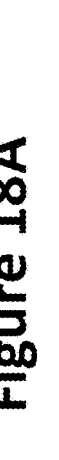
Figure 18C:
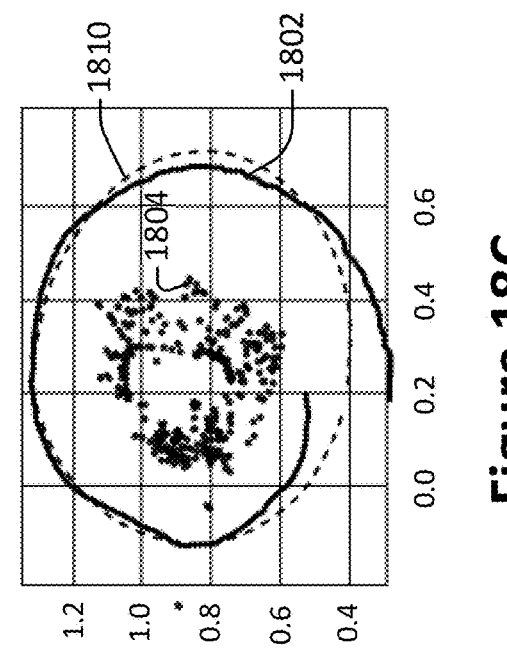

According to various embodiments, to generate the smoothed trajectories, iterative fitting of a polynomial curve in polar coordinate space may be used. For instance, a Gauss-Newton algorithm with a variable damping factor may be employed. In FIG. 18A, a single iteration is employed to generate the smoothed trajectory 1806. In FIG. 18B, three iterations are employed to generate the smoothed trajectory 1808. In FIG. 18C, seven iterations are employed to generate the smoothed trajectory 1810. In FIG. 18D, ten iterations are employed to generate the smoothed trajectory 1812.

As shown in FIGS. 18A, 18B, 18C, and 18D, successive iterations provide for an improved smoothed trajectory fit to the original trajectory. However, successive iterations also provide for diminishing returns in smoothed trajectory fit, and require additional computing resources for calculation.

Figure 5:
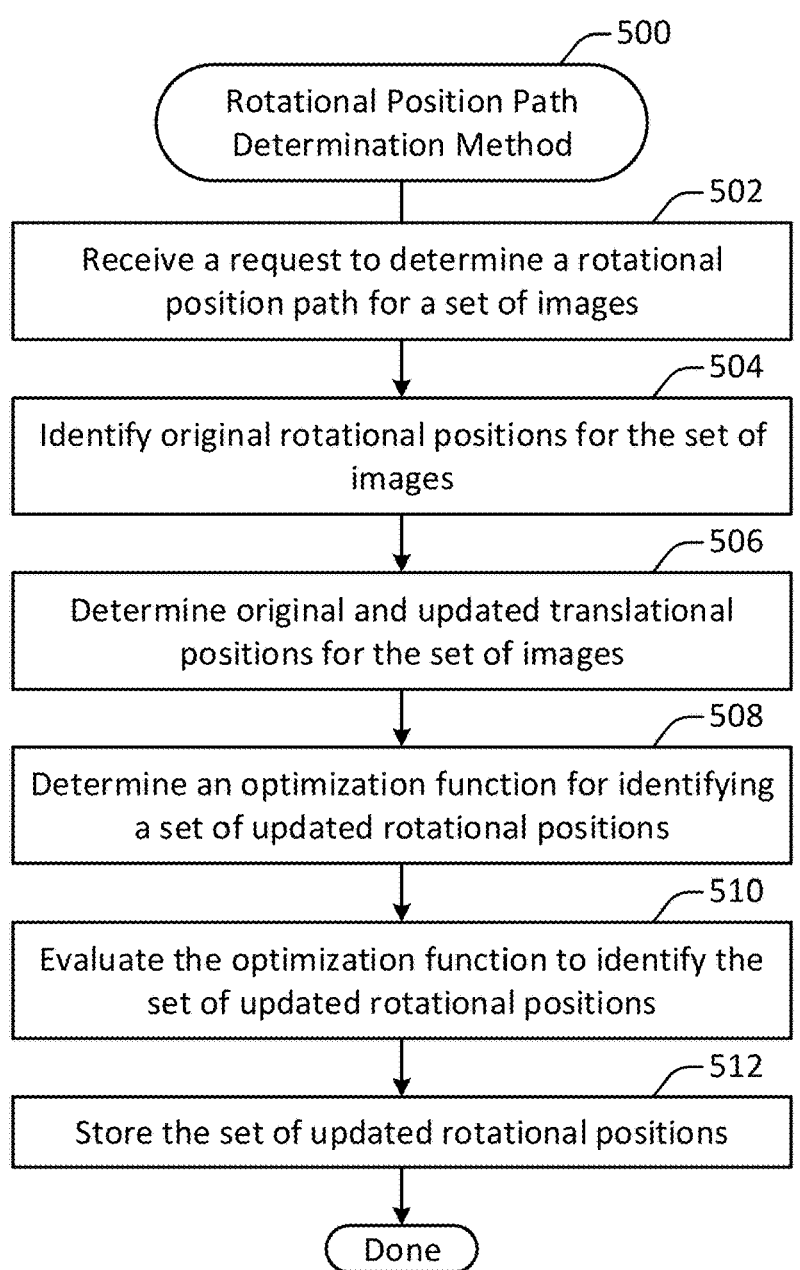
FIG. 5 illustrates one example of a method for rotational position path modeling, performed in accordance with one or more embodiments.

FIG. 5 illustrates one example of a method 500 for rotational position path modeling, performed in accordance with one or more embodiments. According to various embodiments, the method 500 may be performed on a mobile computing device that captures images along a path. Alternatively, the method 500 may be performed on a different computing device, such as a remote server to which data from a mobile computing device is transmitted.

A request to determine a rotational position path for a set of images is received at 502. In some implementations, the request may be generated automatically after updated translational positions are determined for the set of images. For instance, the request may be generated after the completion of the method 300 shown in FIG. 3. Alternatively, or additionally, one or more operations shown in FIG. 5 may be performed concurrently with the determination of updated translational positions. For instance, updated rotational and/or translational positions may be determined within the same optimization function.

Original rotational positions for the set of images are identified at 504. According to various embodiments, each original rotational position may be specified in two-dimensional or three-dimensional space. For example, a rotational position may be specified as a two-dimensional vector on a plane. As yet another example, a rotational position may be specified as a three-dimensional vector in a Cartesian coordinate space. As yet another example, a rotational position may be specified as having values for pitch, roll, and yaw.

In some implementations, the original rotational positions may be specified as discussed with respect to the translational positions. For instance, information such as IMU data, visual image data, and depth sensor information may be analyzed to determine a rotational position for each image in a set of images. As one example, IMU data may be used to estimate a change in rotational position from on image to the next.

An optimization function for identifying a set of updated rotational positions is determined at 508. According to various embodiments, the optimization function may be determined at least in part by specifying one or more loss functions. For example, one loss function may identify a difference between an image's original rotational position and the image's updated rotational position. Thus, more severe rotational position changes from the image's original rotational position may be penalized. As another example, another loss function may identify a difference between a previous image's updated rotational position and the focal image's updated rotational position along a sequence of images. Thus, more severe rotational position changes from one image to the next may be penalized.

In some implementations, the optimization may be determined at least in part by specifying a functional form for combining one or more loss functions. For example, the functional form may include a weighting of different loss functions. For instance, a loss function identifying a difference between a previous image's updated rotational position and the focal image's updated rotational position may be associated with a first weighting value, and loss function may identify a difference between an image's original rotational position and the image's updated rotational position may be assigned a second weighting value. As another example, the functional form may include an operator such as squaring one or more of the loss functions. Accordingly, larger deviations may be penalized at a proportionally greater degree than smaller changes.

The optimization function is evaluated at 510 to identify the set of updated rotational positions. According to various embodiments, evaluating the optimization function may involve applying a numerical solving procedure to the optimization function determined at 510. The numerical solving procedure may identify an acceptable, but not necessarily optimal, solution. The solution may indicate, for some or all of the images, an updated rotational position in accordance with the optimization function.

The set of updated rotational positions is stored at 512. According to various embodiments, the set of updated rotational positions may be used, along with the updated translational positions, to determine updated images for the set of images. Techniques for determining image transformations are discussed in additional detail with respect to the method 1900 shown in FIG. 19.

Figure 19:
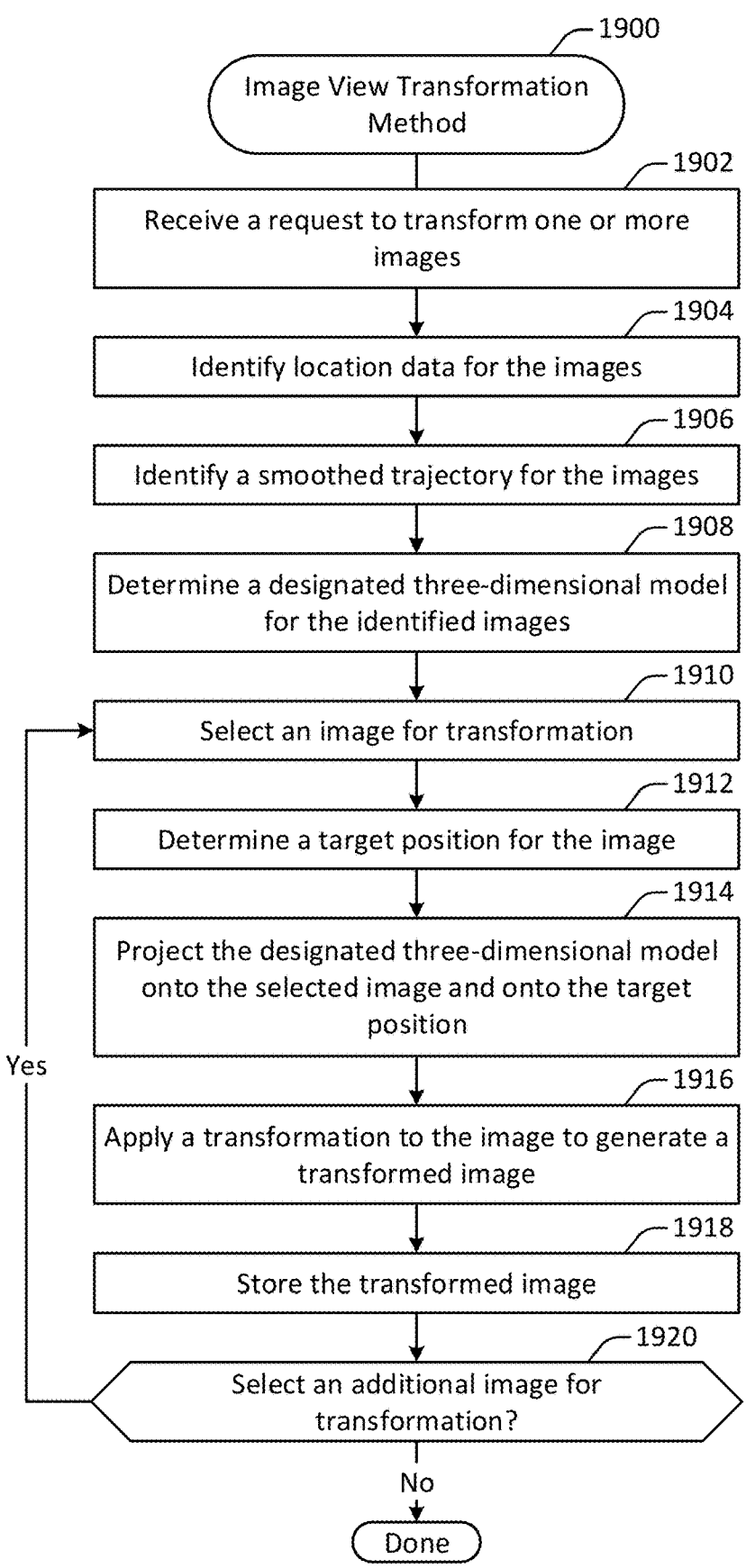
FIG. 19 illustrates one example of a method for image view transformation, performed in accordance with one or more embodiments.

FIG. 19 illustrates one example of a method 1900 for image view transformation, performed in accordance with one or more embodiments. According to various embodiments, the method 1900 may be performed on a mobile computing device that captures images along a path. Alternatively, the method 1900 may be performed on a different computing device, such as a remote server to which data from a mobile computing device is transmitted.

In some implementations, the method 1900 may be performed in order to transform images such that their perspective better matches the smoothed trajectory determined as described with respect to FIG. 3. Such transformations may allow the images to be positioned in an MVIDMR so that navigation between the images is smoother than would be the case with untransformed images. The images identified at 1902 may include some or all of the images identified at operation 302 shown in FIG. 3.

A request to transform one or more images is received at 1902. According to various embodiments, the request may be generated automatically. For instance, after the path modeling is performed as described with respect to the method 300, images may automatically be transformed to reposition their perspectives to more closely match the smoothed trajectory. Alternatively, the request to transform one or more images may be generated based on user input. For instance, a user may request to transform all images associated with locations that are relatively distant from the smoothed trajectory, or even select particular images for transformation.

Location data for the images is identified at 1904. A smoothed trajectory is identified at 1906. According to various embodiments, the location data and the smoothed trajectory may be identified as discussed with respect to the method 300 shown in FIG. 3.

A designated three-dimensional model for the identified images is determined at 1908. According to various embodiments, designated the three-dimensional model may include points in a three-dimensional space. The points may be connected by edges that together form surfaces. The designated three-dimensional model may be determined using one or more of a variety of techniques.

In some embodiments, a three-dimensional model may be performed by analyzing the contents of the images. For example, object recognition may be performed to identify one or more objects in an image. The object recognition analysis for one or more images may be combined with the location data for those images to generate a three-dimensional model of the space.

In some implementations, a three-dimensional model may be created at least in part based on depth sensor information collected from a depth sensor at the computing device. The depth sensor may provide data that indicates a distance from the sensor to various points in the image. This data may be used to position an abstract of various portions of the image in three-dimensional space, for instance via a point cloud.

One or more of a variety of depth sensors may be used, including time-of-flight, infrared, structured light, LIDAR, or RADAR.

An image is selected for transformation at 1910. In some embodiments, each of the images in the set may be transformed. Alternatively, only those images that meet one or more criteria, such as distance from the transformed trajectory, may be formed.

According to various embodiments, the image may be selected for transformation based on any of a variety of criteria. For example, images that are further away from the smoothed trajectory may be selected first. As another example, images may be selected in sequence until all suitable images have been processed for transformation.

A target position for the image is determined at 1912. In some implementations, the target position for the image may be determined by finding a position along the smoothed trajectory that is proximate to the original position associated with the image. For example, the target position may be the position along the smoothed trajectory that is closest to the image's original position. As another example, the target position may be selected so as to maintain a relatively equal distance between images along the smoothed trajectory.

According to various embodiments, the target position may include a translation from the original translational position to an updated translational position. Alternatively, or additionally, the target position may include a rotation from an original rotational position associated with the selected image to an updated rotational position.

At 1914, the designated three-dimensional model is projected onto the selected image and onto the target position. According to various embodiments, the three-dimensional model may include a number of points in a point cloud. Each point may be specified as a position in three-dimensional space. Since the positions in three-dimensional space of the selected image and the target position are known, these points may then be projected onto those virtual camera viewpoints. In the case of the selected image, the points in the point cloud may then be positioned onto the selected image.

At 1916, a transformation to the image is applied to generate a transformed image. According to various embodiments, the transformation may be applied by first determining a function to translate the location of each of the points in the point cloud from its location when projected onto the selected image to its corresponding location when projected onto the virtual camera viewpoint associated with the target position for the image. Based on this translation function, other portions of the selected image may be similarly translated to the target position. For instance, a designated pixel or other area within the selected image may be translated based on a function determined as a weighted average of the translation functions associated with the nearby points in the point cloud.

The transformed image is stored at 1918. In some implementations, the transformed image may be stored for use in generating an MVIDMR. Because the images have been transformed such that their perspective more closely matches the smoothed trajectory, navigation between different images may appear to be more seamless.

A determination is made at 1920 as to whether to select an additional image for transformation. As discussed with respect to operation 1910, a variety of criteria may be used to select images for transformation. Additional images may be selected for transformation until all images that meet the designated criteria have been transformed.

FIGS. 18A, 18B, 18C, and 18D illustrate examples of viewpoint path modeling diagrams, generated in accordance with one or more embodiments. In each figure, the path 1802 indicates the original trajectory along which the images were captured. The points 1804 indicate portions of the object being captured by the images. In each figure, a smoothed trajectory is generated using smooth loop closure.

Figure 6:
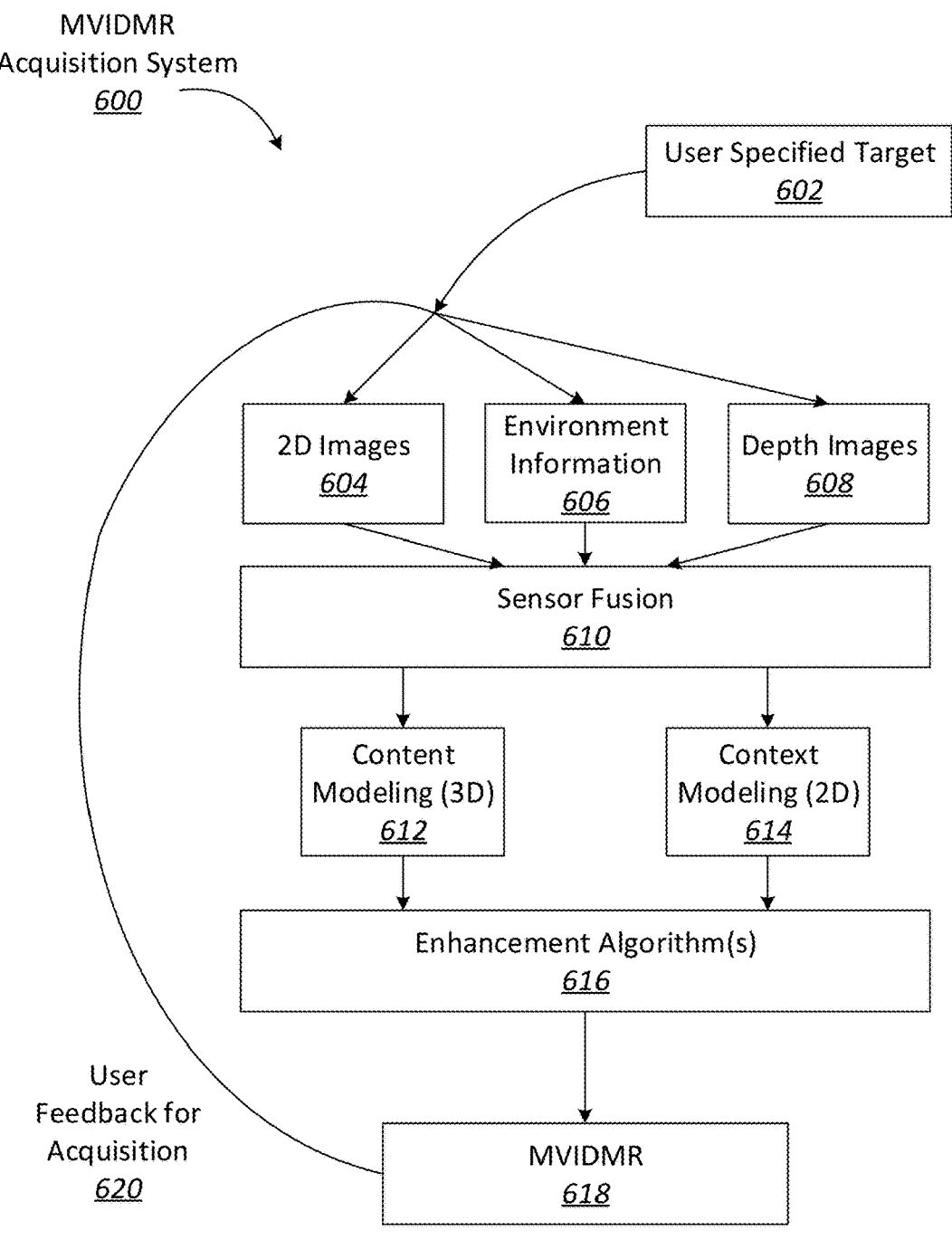
FIG. 6 illustrates an example of a MVIDMR acquisition system, configured in accordance with one or more embodiments.

FIG. 6 shows an example of a MVIDMR acquisition system 600, configured in accordance with one or more embodiments. The MVIDMR acquisition system 600 is depicted in a flow sequence that can be used to generate a MVIDMR. According to various embodiments, the data used to generate a MVIDMR can come from a variety of sources.

In particular, data such as, but not limited to two-dimensional (2D) images 604 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 606. This environment information 606 can be obtained from sources such as accelerometers, gyroscopes, magnetometers, GPS, Wi-Fi, IMU-like systems (Inertial Measurement Unit systems), and the like. Yet another source of data that can be used to generate a MVIDMR can include depth images 608. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 610. In some embodiments, a MVIDMR can be generated a combination of data that includes both 2D images 604 and environment information 606, without any depth images 608 provided. In other embodiments, depth images 608 and environment information 606 can be used together at sensor fusion block 610. Various combinations of image data can be used with environment information at 606, depending on the application and available data.

In some embodiments, the data that has been fused together at sensor fusion block 610 is then used for content modeling 612 and context modeling 614. The subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 612 and context modeling 614 can be generated by combining the image and location information data.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 602 can be chosen, as shown in FIG. 6. It should be noted, however, that a MVIDMR can be generated without a user-specified target in some applications.

In some embodiments, one or more enhancement algorithms can be applied at enhancement algorithm(s) block 616. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 616. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context.

This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 618 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 618 is generated, user feedback for acquisition 620 of additional image data can be provided. In particular, if a MVIDMR is determined to need additional views to provide a more accurate model of the content or context, a user may be prompted to provide additional views. Once these additional views are received by the MVIDMR acquisition system 600, these additional views can be processed by the system 600 and incorporated into the MVIDMR.

Additional details regarding multi-view data collection, multi-view representation construction, and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

Figure 7:
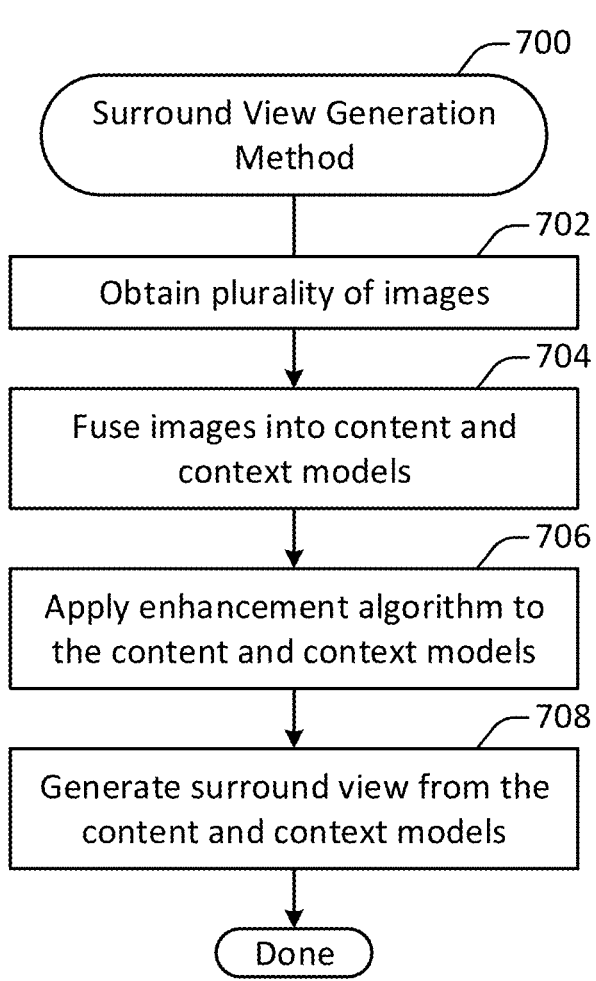
FIG. 7 illustrates one example of a method for generating a MVIDMR, performed in accordance with one or more embodiments.

FIG. 7 shows an example of a process flow diagram for generating a MVIDMR 700. In the present example, a plurality of images is obtained at 702. According to various embodiments, the plurality of images can include two-dimensional (2D) images or data streams. These 2D images can include location information that can be used to generate a MVIDMR. In some embodiments, the plurality of images can include depth images. The depth images can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 702 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 704. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 706. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 708. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

Figure 8:
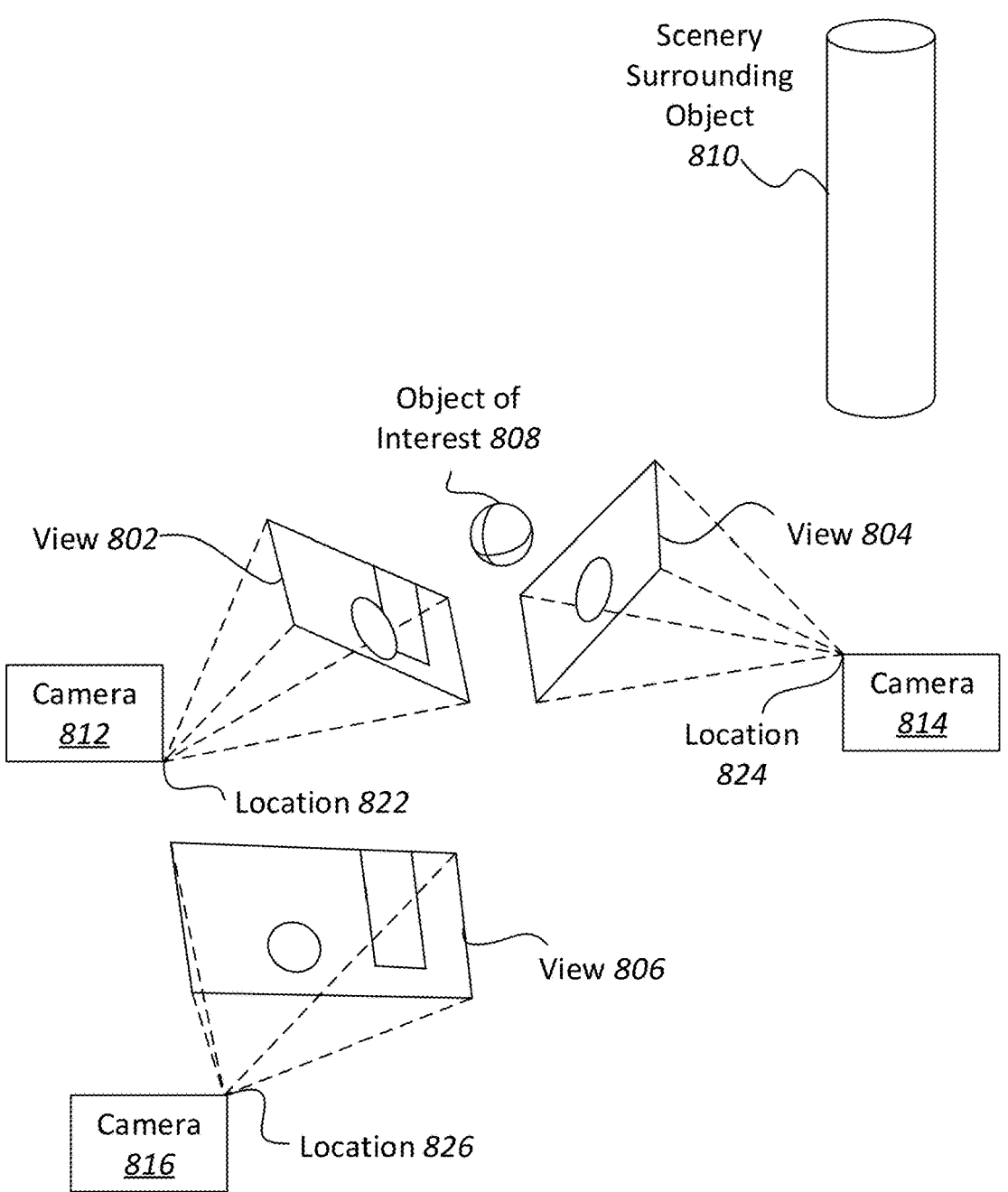
FIG. 8 illustrates one example of multiple camera views fused together into a three-dimensional (3D) model.

FIG. 8 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 812, 814, and 816 are positioned at locations 822, 824, and 826, respectively, in proximity to an object of interest 808. Scenery can surround the object of interest 808 such as object 810. Views 802, 804, and 806 from their respective cameras 812, 814, and 816 include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 810. View 806 shows the object of interest 808 to one side of the cylinder, and view 804 shows the object of interest without any view of the cylinder.

In some embodiments, the various views 802, 804, and 816 along with their associated locations 822, 824, and 826, respectively, provide a rich source of information about object of interest 808 and the surrounding context that can be used to produce a MVIDMR. For instance, when analyzed together, the various views 802, 804, and 826 provide information about different sides of the object of interest and the relationship between the object of interest and the scenery. According to various embodiments, this information can be used to parse out the object of interest 808 into content and the scenery as the context. Furthermore, various algorithms can be applied to images produced by these viewpoints to create an immersive, interactive experience when viewing a MVIDMR.

Figure 9:
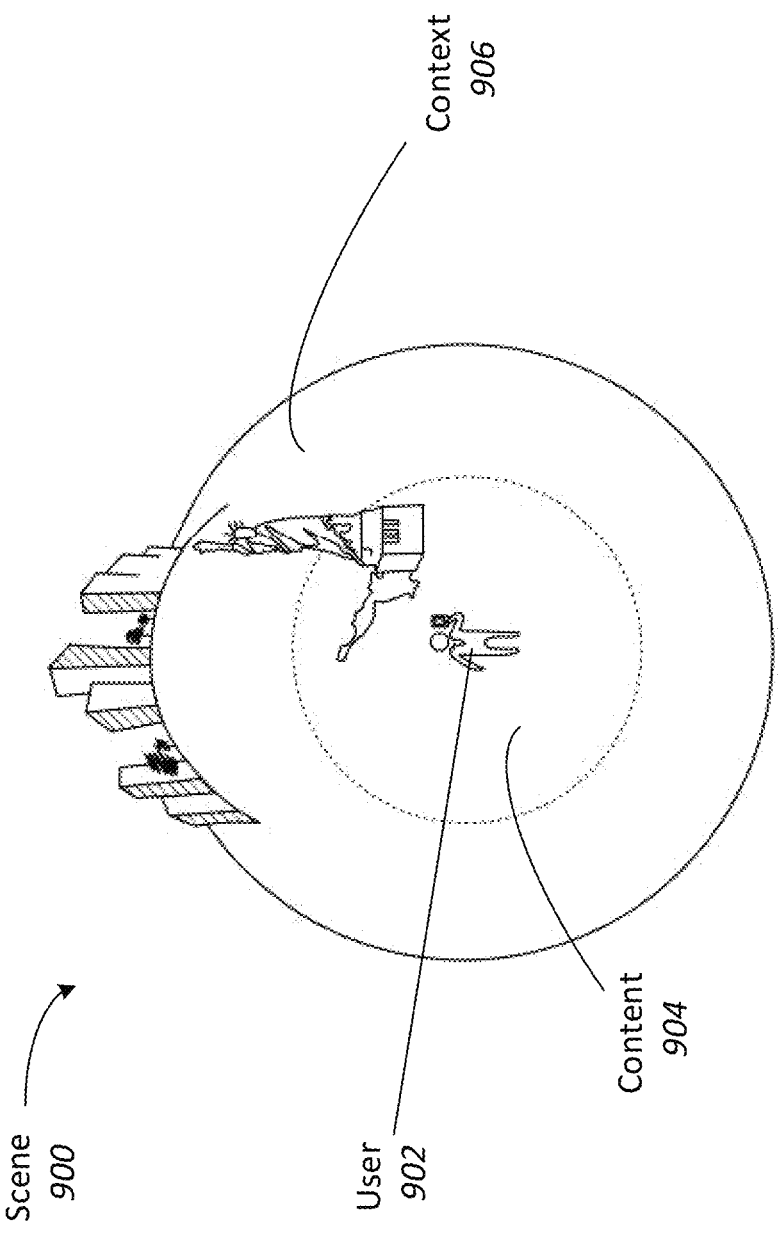
FIG. 9 illustrates one example of separation of content and context in a MVIDMR.

FIG. 9 illustrates one example of separation of content and context in a MVIDMR. According to various embodiments, a MVIDMR is a multi-view interactive digital media representation of a scene 900. With reference to FIG. 9, shown is a user 902 located in a scene 900. The user 902 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 904 and context 906. According to particular embodiments, content 904 can include the object(s), person(s), or scene(s) of interest while the context 906 represents the remaining elements of the scene surrounding the content 904. In some embodiments, a MVIDMR may represent the content 904 as three-dimensional data, and the context 906 as a two-dimensional panoramic background. In other examples, a MVIDMR may represent both the content 904 and context 906 as two-dimensional panoramic scenes. In yet other examples, content 904 and context 906 may include three-dimensional components or aspects. In particular embodiments, the way that the MVIDMR depicts content 904 and context 906 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 904 and the context 906 may be the same. In these examples, the MVIDMR produced may have some characteristics that are similar to other types of digital media such as panoramas.

However, according to various embodiments, MVIDMRs include additional features that distinguish them from these existing types of digital media. For instance, a MVIDMR can represent moving data. Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

Figures 10A, 10B:
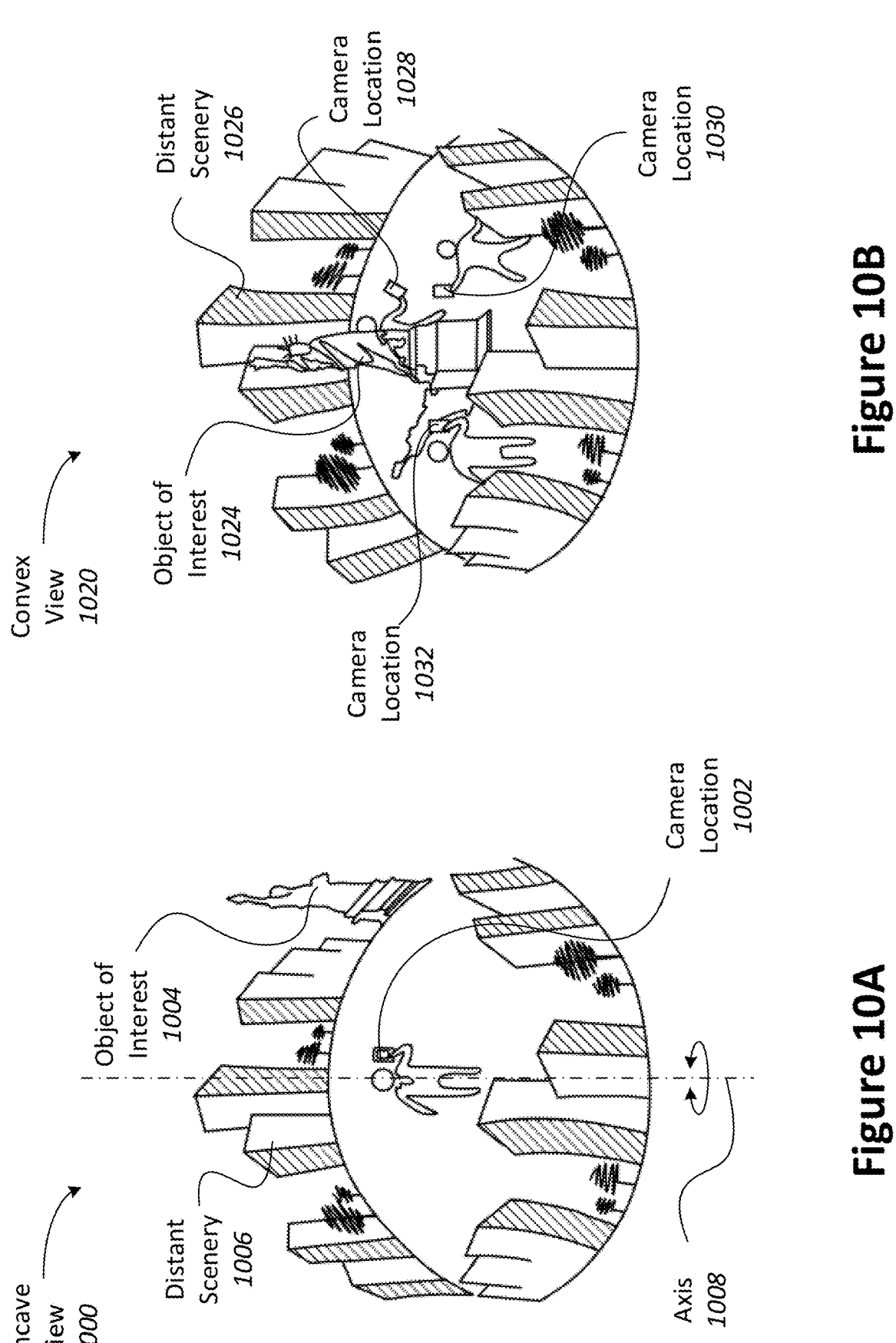
FIGS. 10A-10B illustrate examples of concave and convex views, where both views use a back-camera capture style.

FIGS. 10A-10B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 10A, shown is one example of a concave view 1000 in which a user is standing along a vertical axis 1008. In this example, the user is holding a camera, such that camera location 1002 does not leave axis 1008 during image capture. However, as the user pivots about axis 1008, the camera captures a panoramic view of the scene around the user, forming a concave view. In this embodiment, the object of interest 1004 and the distant scenery 1006 are all viewed similarly because of the way in which the images are captured. In this example, all objects in the concave view appear at infinity, so the content is equal to the context according to this view.

With reference to FIG. 10B, shown is one example of a convex view 1020 in which a user changes position when capturing images of an object of interest 1024. In this example, the user moves around the object of interest 1024, taking pictures from different sides of the object of interest from camera locations 1028, 1030, and 1032. Each of the images obtained includes a view of the object of interest, and a background of the distant scenery 1026. In the present example, the object of interest 1024 represents the content, and the distant scenery 1026 represents the context in this convex view.

Figure 11A:
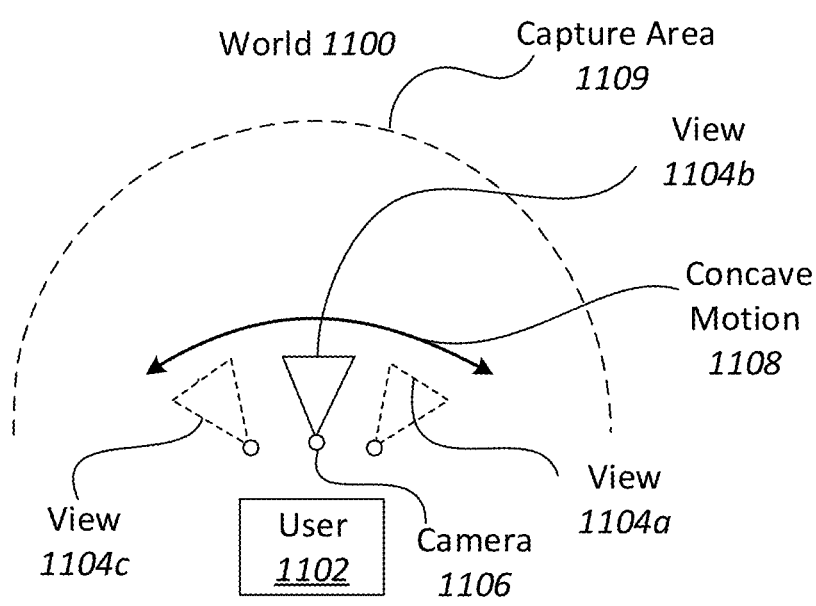
FIGS. 11A-11B illustrates one example of a back-facing, concave MVIDMR, generated in accordance with one or more embodiments.
Figure 11B:
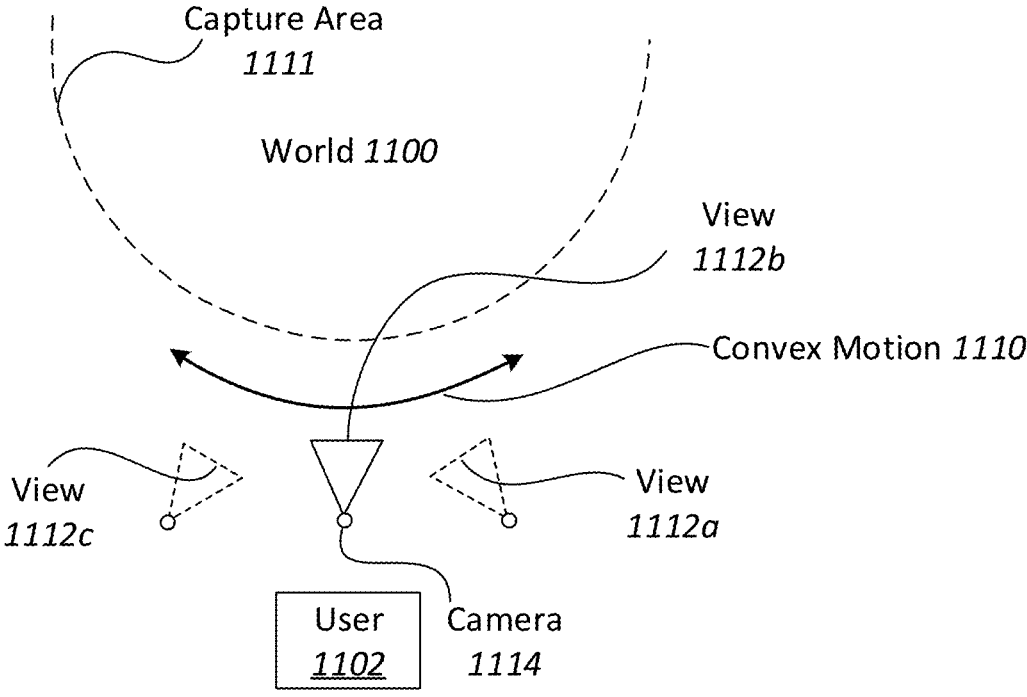

FIGS. 11A-11B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

With reference to FIG. 11A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 170 panorama (pure rotation), although the motion can be generalized to any curved sweeping motion in which the view faces outward. In the present example, the experience is that of a stationary viewer looking out at a (possibly dynamic) context.

In some embodiments, a user 1102 is using a back-facing camera 1106 to capture images towards world 1100, and away from user 1102. As described in various examples, a back-facing camera refers to a device with a camera that faces away from the user, such as the camera on the back of a smart phone. The camera is moved in a concave motion 1108, such that views 1104a, 1104b, and 1104c capture various parts of capture area 1109.

With reference to FIG. 11B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 1102 is using a back-facing camera 1114 to capture images towards world 1100, and away from user 1102. The camera is moved in a convex motion 1110, such that views 1112a, 1112b, and 1112c capture various parts of capture area 1111. As described above, world 1100 can include an object of interest in some examples, and the convex motion 1110 can orbit around this object. Views 1112a, 1112b, and 1112c can include views of different sides of this object in these examples.

Figure 12A:
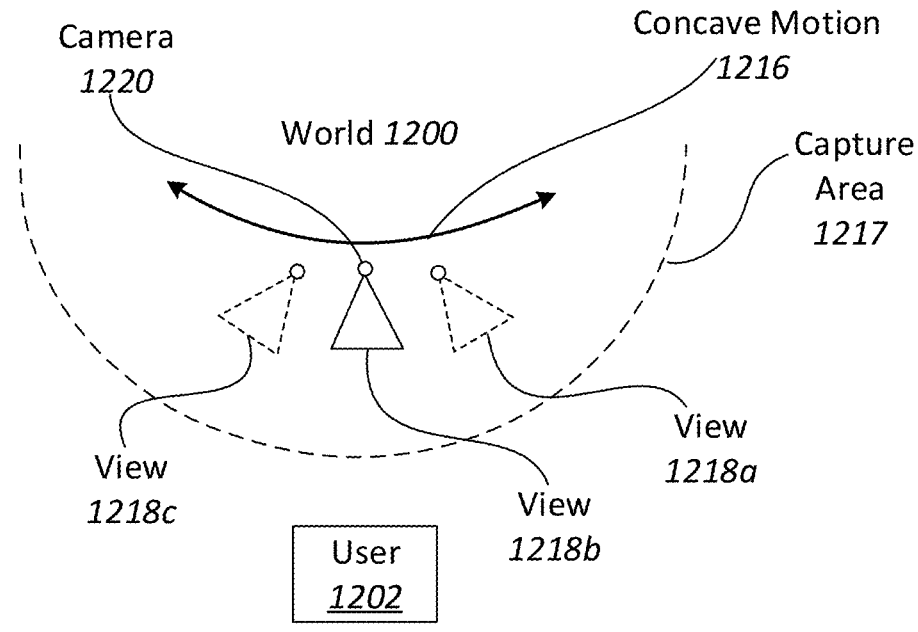
FIGS. 12A-12B illustrate examples of front-facing, concave and convex MVIDMRs generated in accordance with one or more embodiments.

With reference to FIG. 12A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 1220 is facing user 1202. The camera follows a concave motion 1206 such that the views 1218a, 1218b, and 1218c diverge from each other in an angular sense. The capture area 1217 follows a concave shape that includes the user at a perimeter.

Figure 12B:
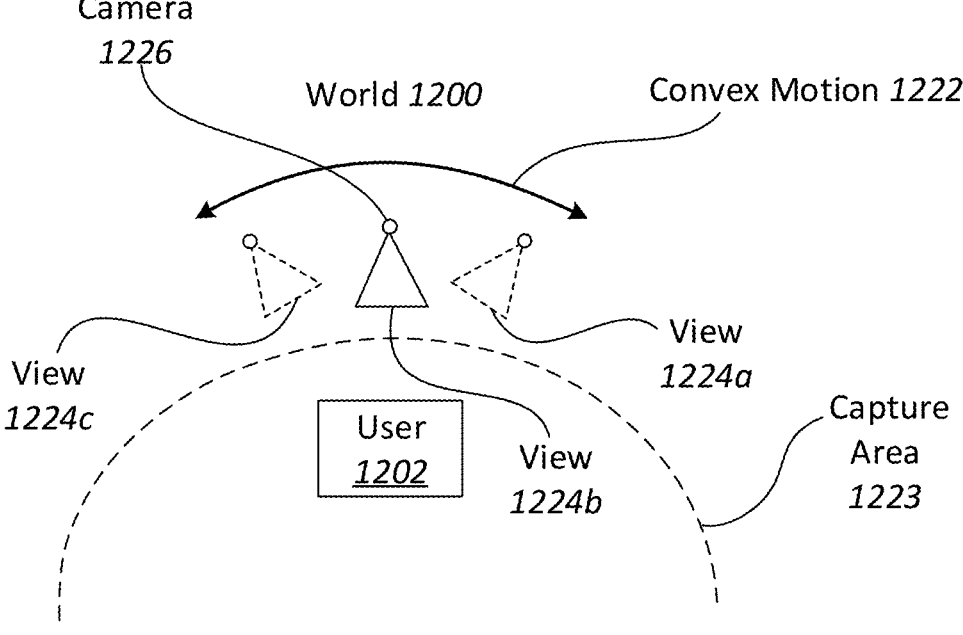

With reference to FIG. 12B, shown is an example of a front-facing, convex MVIDMR being captured. In some embodiments, camera 1226 is facing user 1202. The camera follows a convex motion 1222 such that the views 1224a, 1224b, and 1224c converge towards the user 1202. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

Figure 13:
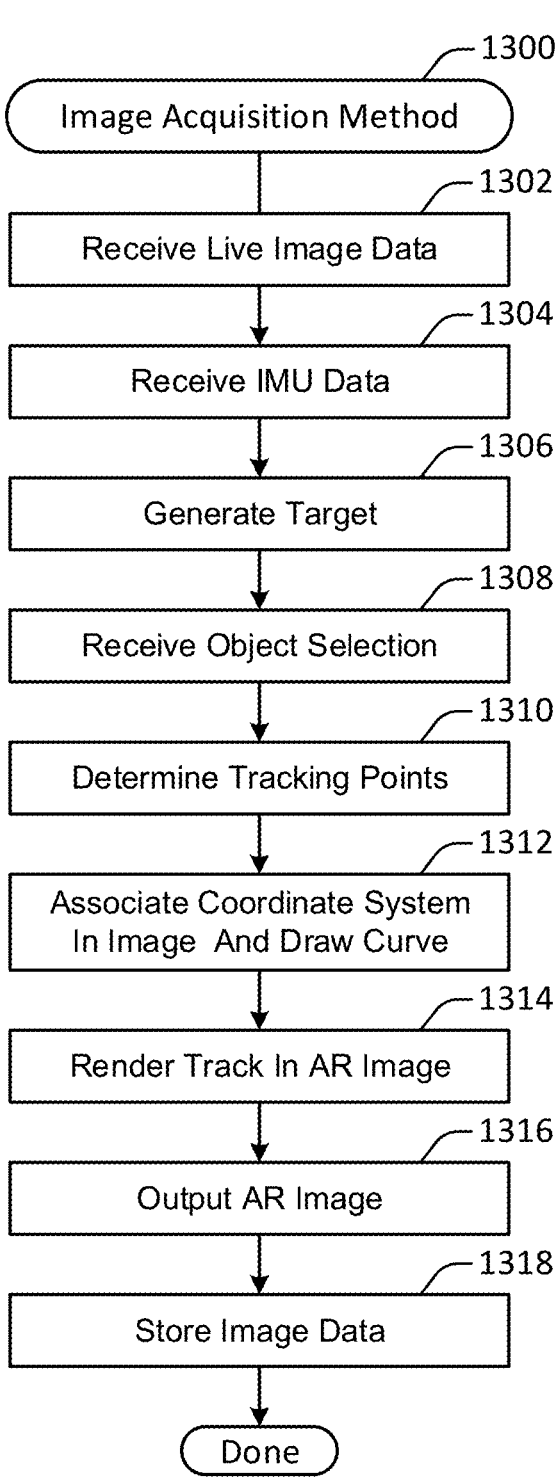
FIG. 13 illustrates one example of a method for generating virtual data associated with a target using live image data, performed in accordance with one or more embodiments.
Figure 14:
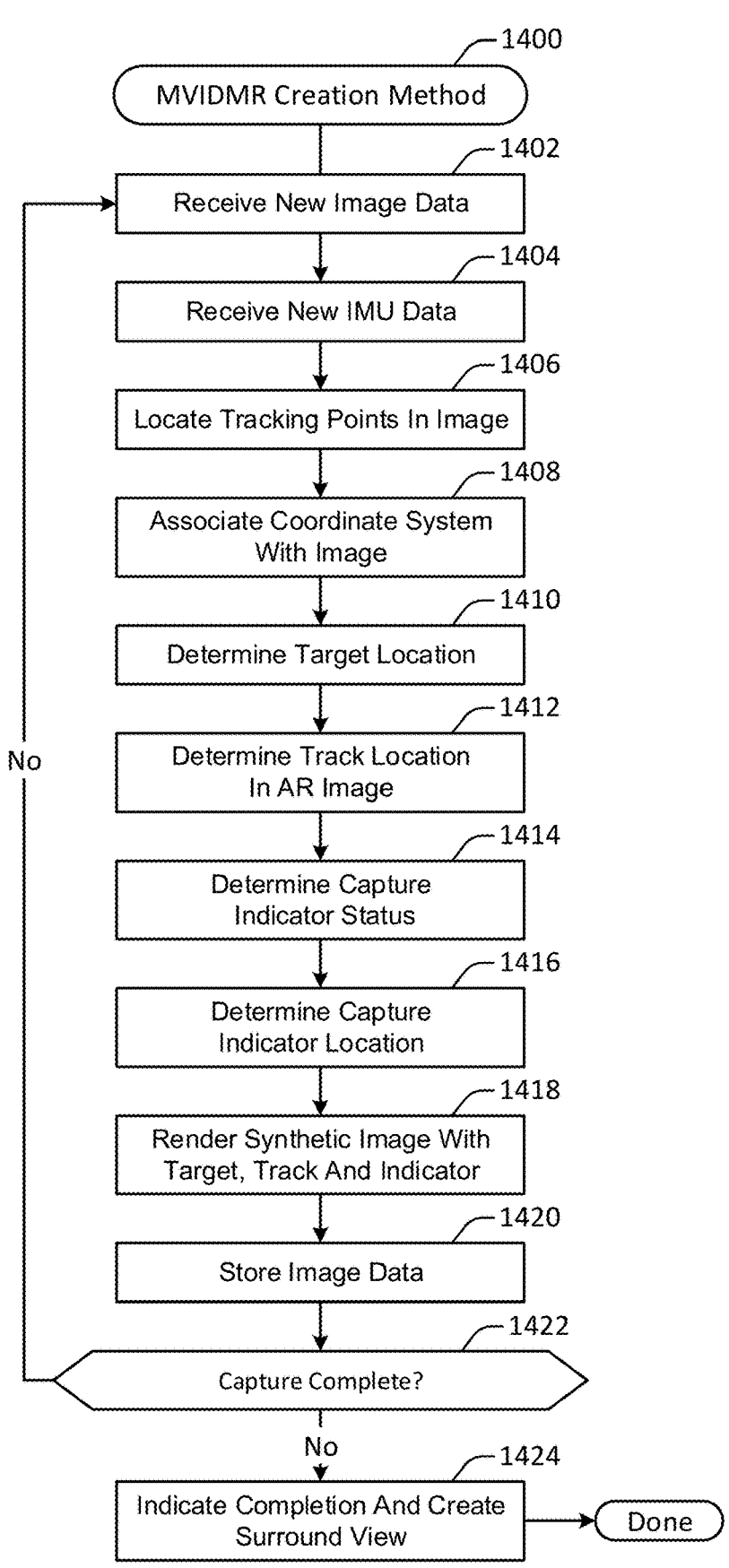
FIG. 14 illustrates one example of a method for generating MVIDMRs, performed in accordance with one or more embodiments.

FIGS. 13 and 14 illustrate an example of a process flow for capturing images in a MVIDMR using augmented reality. In 1302, live image data can be received from a camera system. For example, live image data can be received from one or more cameras on a handheld mobile device, such as a smartphone. The image data can include pixel data captured from a camera sensor. The pixel data varies from frame to frame. In some embodiments, the pixel data can be 2-D. In other embodiments, depth data can be included with the pixel data.

In 1304, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 13, in 1306, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1308, the object selection can be received. The object selection can be used to determine an area within the image data to identify tracking points. When the area in the image data is over a target, the tracking points can be associated with an object appearing in the live image data.

In 1310, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1312, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1314, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1314, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data. The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1312.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 13, in 1316, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 12 frames per second can be output at 15 frames per second. In another embodiment, the AR images can be output at a reduced resolution, such as 60p instead of 480p. The reduced resolution can also be used to reduce computational requirements.

In 1318, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 14, the method in FIG. 13 is continued. In 1422, new image data can be received. In 1424, new IMU data (or, in general sensor data) can be received. The IMU data can represent a current orientation of the camera. In 1426, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1426, a determination may be made whether a tracking point is still visible in an image. In addition, a determination may be made as to whether a new portion of the targeted object has come into view. New tracking points can be added to the new portion to allow for continued tracking of the real object from frame to frame.

In 1428, a coordinate system can be associated with the image. For example, using an orientation of the camera determined from the sensor data, the pixel data can be calibrated to an Earth reference frame as previously described. In 1430, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1432, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1434, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1436, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1438, a synthetic image, i.e., a live image augmented with virtual objects, can be generated. The synthetic image can include the target, the track and one or more status indicators at their determined locations, respectively. In 1440, image data captured for the purposes of use in a MVIDMR can be captured. As described above, the stored image data can be raw image data without virtual objects or may include virtual objects.

In 1442, a check can be made as to whether images needed to generate a MVIDMR have been captured in accordance with the selected parameters, such as a MVIDMR spanning a desired angle range. When the capture is not complete, new image data may be received and the method may return to 1422. When the capture is complete, a virtual object can be rendered into the live image data indicating the completion of the capture process for the MVIDMR and a MVIDMR can be created. Some virtual objects associated with the capture process may cease to be rendered. For example, once the needed images have been captured the track used to help guide the camera during the capture process may no longer be generated in the live image data.

Figures 15A, 15B:
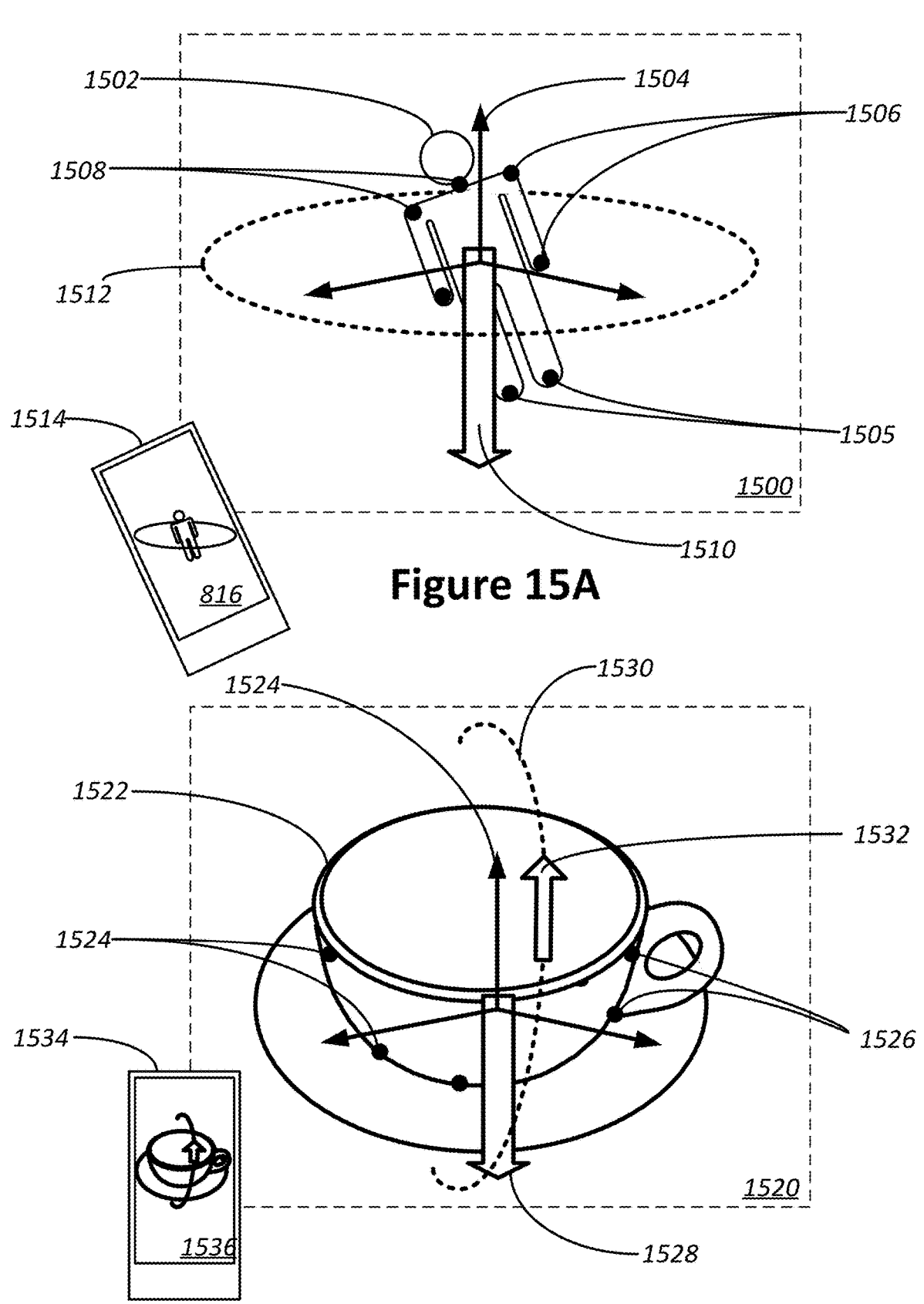
FIGS. 15A and 15B illustrate some aspects of generating an Augmented Reality (AR) image capture track for capturing images used in a MVIDMR.

FIGS. 15A and 15B illustrate aspects of generating an Augmented Reality (AR) image capture track for capturing images used in a MVIDMR. In FIG. 15A, a mobile device 1514 with a display 1516 is shown. The mobile device can include at least one camera (not shown) with a field of view 1500. A real object 1502, which is a person, is selected in the field of view 1500 of the camera. A virtual object, which is a target (not shown), may have been used to help select the real object. For example, the target on a touch screen display of the mobile device 1514 may have been placed over the object 1502 and then selected.

The camera can include an image sensor which captures light in the field of view 1500. The data from the image sensor can be converted to pixel data. The pixel data can be modified prior to its output on display 1516 to generate a synthetic image. The modifications can include rendering virtual objects in the pixel data as part of an augmented reality (AR) system.

Using the pixel data and a selection of the object 1502, tracking points on the object can be determined. The tracking points can define the object in image space. Locations of a current set of tracking points, such as 1505, 1506 and 1508, which can be attached to the object 1502 are shown. As a position and orientation of the camera on the mobile device 1514, the shape and position of the object 1502 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1514, an Earth reference frame 3-D coordinate system 1504 can be associated with the image data. The direction of the gravity vector is indicated by arrow 1510. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 1505, 1506 and 1508. Using this information, a curve, which is a circle, is drawn in the plane. The circle can be rendered into to the 2-D image data and output as part of the AR system. As is shown on display 1516, the circle appears to surround the object 1502. In some embodiments, the circle can be used as a guide for capturing images used in a MVIDMR.

If the camera on the mobile device 1514 is rotated in some way, such as tilted, the shape of the object will change on display 1516. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1502. Thus, the curve can appear to remain parallel to the ground, i.e., perpendicular to the gravity vector, as the camera 1514 moves. However, the position of the curve can move from location to location in the image as the position of the object and its apparent shape in the live images changes.

In FIG. 15B, a mobile device 1534 including a camera (not shown) and a display 1536 for outputting the image data from the camera is shown. A cup 1522 is shown in the field of view of camera 1520 of the camera. Tracking points, such as 1524 and 1526, have been associated with the object 1522. These tracking points can define the object 1522 in image space. Using the IMU data from the mobile device 1534, a reference frame has been associated with the image data. As described above, In some embodiments, the pixel data can be calibrated to the reference frame. The reference frame is indicated by the 3-D axes 1524 and the direction of the gravity vector is indicated by arrow 1528.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1530. In general, any plane can be determined in the reference frame and then a curve, which is used as a guide, can be rendered into the selected plane.

Using the locations of the tracking points, in some embodiments a centroid of the object 1522 on the selected plane in the reference can be determined. A curve 1530, such as a circle, can be rendered relative to the centroid. In this example, a circle is rendered around the object 1522 in the selected plane.

The curve 1530 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1532.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1530 is not a one to one ratio with the distance moved in physical space. In another example, a total time to traverse the path 1530 can be estimated and then the length of time during which images have been recorded can be tracked. The ratio of the recording time to the total time can be used to indicate progress along the path 1530.

The path 1530, which is an arc, and arrow 1532 are rendered into the live image data as virtual objects in accordance with their positions in the 3-D coordinate system associated with the live 2-D image data. The cup 1522, the circle 1530 and the arrow 1532 are shown output to display 1536. The orientation of the curve 1530 and the arrow 1532 shown on display 1536 relative to the cup 1522 can change if the orientation of the camera is changed, such as if the camera is tilted.

In particular embodiments, a size of the object 1522 in the image data can be changed. For example, the size of the object can be made bigger or smaller by using a digital zoom. In another example, the size of the object can be made bigger or smaller by moving the camera, such as on mobile device 1534, closer or farther away from the object 1522.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1530 and/or arrow 1532. Thus, a size of the curve relative to the object can be maintained.

In another embodiment, a size of the curve can remain fixed. For example, a diameter of the curve can be related to a pixel height or width of the image, such as 150 percent of the pixel height or width. Thus, the object 1522 can appear to grow or shrink as a zoom is used or a position of the camera is changed. However, the size of curve 1530 in the image can remain relatively fixed.

Figure 16:
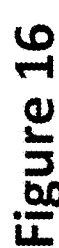
FIG. 16 illustrates one example of generating an Augmented Reality (AR) image capture track for capturing images used in a MVIDMR on a mobile device.

FIG. 16 illustrates a second example of generating an Augmented Reality (AR) image capture track for capturing images used in a MVIDMR on a mobile device. FIG. 16 includes a mobile device at three times 1600a, 1600b and 1600c. The device can include at least one camera, a display, an IMU, a processor (CPU), memory, microphone, audio output devices, communication interfaces, a power supply, graphic processor (GPU), graphical memory and combinations thereof. The display is shown with images at three times 1606a, 1606b and 1606c. The display can be overlaid with a touch screen.

In 1606a, an image of an object 1608 is output to the display in state 1606a. The object is a rectangular box. The image data output to the display can be live image data from a camera on the mobile device. The camera could also be a remote camera.

In some embodiments, a target, such as 1610, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1612, 1614 and 1616. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1604. The orientation change and current orientation of the device can be captured via the IMU data from IMU 1602 on the device.

As the orientation of the device is changed, one or more of the tracking points, such as 1612, 1614 and 1616, can be occluded. In addition, the shape of surfaces currently appearing in the image can change. Based on changes between frames, movement at various pixel locations can be determined. Using the IMU data and the determined movement at the various pixel locations, surfaces associated with the object 1608 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1606c, the live image data is augmented with a path 1622. The beginning and end of the path is indicated by the text, "start" and "finish." The distance along the path is indicated by shaded region 1618.

The circle with the arrow 1620 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

Figure 17:
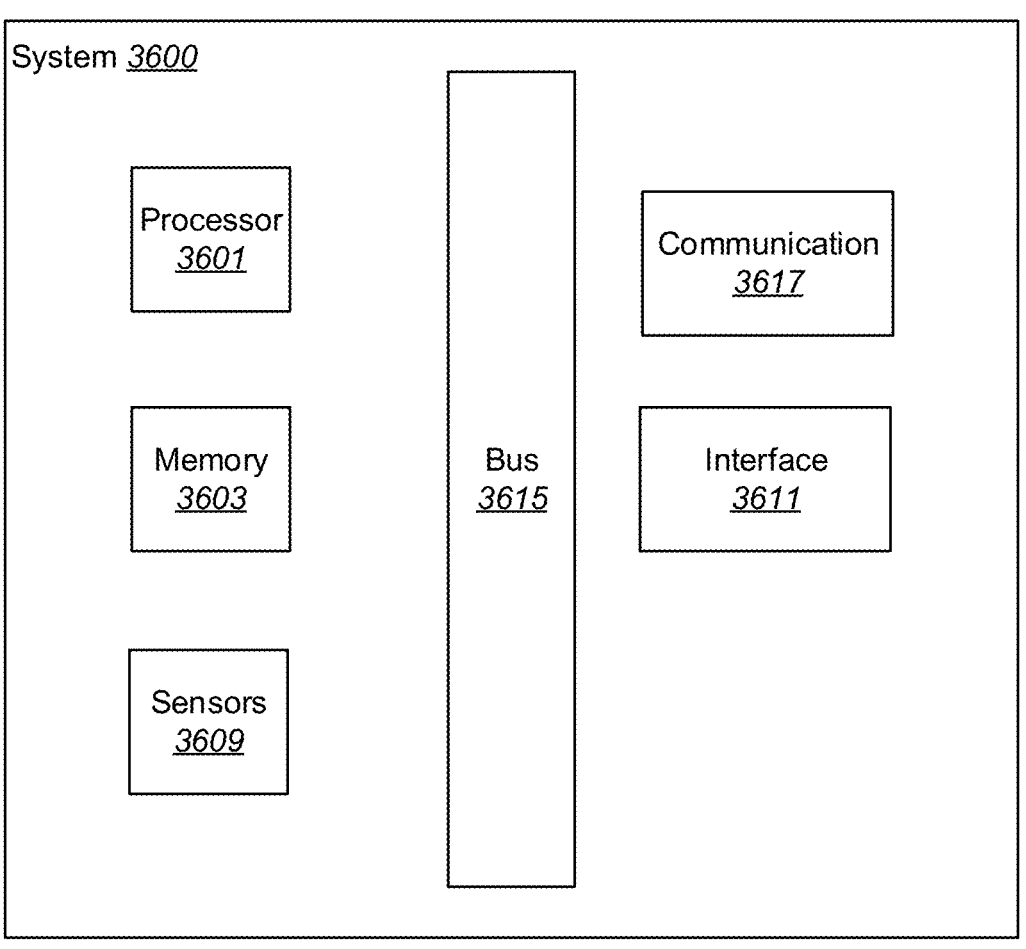
FIG. 17 illustrates a particular example of a computer system configured in accordance with various embodiments.

With reference to FIG. 17, shown is a particular example of a computer system that can be used to implement particular examples. For instance, the computer system 1700 can be used to provide MVIDMRs according to various embodiments described above. According to various embodiments, a system 1700 suitable for implementing particular embodiments includes a processor 1701, a memory 1703, an interface 1711, and a bus 1715 (e.g., a PCI bus).

The system 1700 can include one or more sensors 1709, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 6, 12, 17, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 6 bits and at frame rate of 6 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 6 fps. But, the video transformations can be performed on every other frame and synthetic images can be output at a frame rate of 12 fps. Alternatively, the transformed video data can be interpolated from the 12 fps rate to 6 fps rate by interpolating between two of the transformed video frames.

In another example, prior to performing the video transformations, the resolution of the native video data can be reduced. For example, when the native resolution is 512 by 512 pixels, it can be interpolated to a 76 by 76 pixel array using a method such as pixel averaging and then the transformation can be applied to the 76 by 76 array. The transformed video data can output and/or stored at the lower 76 by 76 resolution. Alternatively, the transformed video data, such as with a 76 by 76 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 6 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 12 milliseconds. In yet other embodiments, the latency can be less than 20 milliseconds. In yet other embodiments, the latency can be less than 10 milliseconds.

The interface 1711 may include separate input and output interfaces, or may be a unified interface supporting both operations. Examples of input and output interfaces can include displays, audio devices, cameras, touch screens, buttons and microphones. When acting under the control of appropriate software or firmware, the processor 1701 is responsible for such tasks such as optimization. Various specially configured devices can also be used in place of a processor 1701 or in addition to processor 1701, such as graphical processor units (GPUs). The complete implementation can also be done in custom hardware. The interface 1711 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1700 uses memory 1703 to store data and program instructions and maintained a local side cache. The program instructions may control the operation of an operating system and/or one or more applications, for example. The memory or memories may also be configured to store received metadata and batch requested metadata.

The system 1700 can be integrated into a single device with a common housing. For example, system 1700 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1700 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

The invention claimed is:

1. A method comprising:

determining a plurality of first coordinate points associated with a first set of images captured by a mobile computing device as the mobile computing device moved along a path through space around an object, wherein movement along the path is subject to variation along the path, each of the first coordinate points identifying a respective location in Cartesian coordinate space;

converting the plurality of first coordinate points to second coordinate points, each of the second coordinate points identifying a respective location in polar coordinate space, wherein the polar coordinate space is defined relative to a center point corresponding to a location of the object;

determining a first trajectory to remove variation along the path by smoothing the first trajectory through the polar coordinate space based on the second coordinate points, wherein smoothing comprises smoothing of radial coordinates of the mobile computing device in the polar coordinate space to reduce variation in radial distance from the object and reducing rotational position changes between images in the first set of images captured by the mobile computing device by evaluating a plurality of loss functions including a first loss function identifying a first difference between a first image's original rotational position and the first image's updated rotational position and a second loss function identifying a difference between a previous image's updated rotational position and a current image's updated rotational position;

determining a second trajectory through the Cartesian coordinate space based on the first trajectory through the polar coordinate space; and determining a second set of images based on the first set of images and the second trajectory, one or more of the second set of images being determined by transforming one or more of the first set of images to match a respective viewpoint associated with the second trajectory, the second set of images having a smoothed trajectory.

2. The method recited in claim 1, wherein each of the first coordinate points corresponds to a respective position of the mobile computing device along the path through space.

3. The method recited in claim 1, wherein the plurality of first coordinate points are determined at least in part via motion data captured from an inertial measurement unit at the mobile computing device.

4. The method recited in claim 3, wherein the motion data includes data selected from the group consisting of: accelerometer data, gyroscopic data, and global positioning system (GPS) data.

5. The method recited in claim 1, wherein the plurality of first coordinate points are determined at least in part via depth sensor data captured from a depth sensor at the mobile computing device.

6. The method recited in claim 1, generating a multiview interactive digital media representation (MVIDMR) that includes the second set of images, the MVIDMR being navigable in one or more dimensions.

7. The method recited in claim 1, wherein each of the first set of images include the object, the path through space moving around the object, and wherein the path through space involves a 360-degree rotation around the object.

8. The method recited in claim 7, wherein the object is a vehicle, and wherein the mobile computing device is a mobile phone.

9. The method recited in claim 1, wherein determining the first trajectory involves fitting a polynomial curve.

10. The method recited in claim 1, wherein determining the second trajectory comprises applying a transformation to the first trajectory, the transformation transforming the first trajectory from polar coordinates to Cartesian coordinates.

11. The method recited in claim 1, wherein determining the first trajectory involves enforcing loop closure by determining a set of projected locations for virtual data points, the projected locations linking a beginning portion of the path through space with an ending portion of the path through space.

12. The method of claim 1, wherein smoothing of the radial coordinates comprises fitting a polynomial curve to the radial coordinates of the second coordinate points.

13. The method of claim 12, wherein evaluating the plurality of loss functions comprises minimizing a functional form that applies a first weighting value to the first loss function and a second weighting value to the second loss function.

14. A mobile computing device comprising:
  a camera configured to capture a first set of images device as the mobile computing device moved along a path through space, wherein movement along the path is subject to variation along the path; and
  a processor configured to cause:
  determining a plurality of first coordinate points associated with a first set of images captured by a mobile computing device as the mobile computing device moved along a path through space around an object, wherein movement along the path is subject to variation along the path, each of the first coordinate points identifying a respective location in Cartesian coordinate space;
  converting the plurality of first coordinate points to second coordinate points, each of the second coordinate points identifying a respective location in polar coordinate space, wherein the polar coordinate space is defined relative to a center point corresponding to a location of the object;
  determining a first trajectory to remove variation along the path by smoothing the first trajectory through the polar coordinate space based on the second coordinate points, wherein smoothing comprises smoothing of radial coordinates of the mobile computing device in the polar coordinate space to reduce variation in radial distance from the object and reducing rotational position changes between images in the first set of images captured by the mobile computing device by evaluating a plurality of loss functions including a first loss function identifying a first difference between a first image's original rotational position and the first image's updated rotational position and a second loss function identifying a difference between a previous image's updated rotational position and a current image's updated rotational position;
  determining a second trajectory through the Cartesian coordinate space based on the first trajectory through the polar coordinate space; and
  determining a second set of images based on the first set of images and the second trajectory, one or more of the second set of images being determined by transforming one or more of the first set of images to match a respective viewpoint associated with the second trajectory, the second set of images having a smoothed trajectory.

15. The mobile computing device recited in claim 14, wherein each of the first coordinate points corresponds to a respective position of the mobile computing device along the path through space.

16. The mobile computing device recited in claim 14, wherein the plurality of first coordinate points are determined at least in part via motion data captured from an inertial measurement unit at the mobile computing device.

17. The mobile computing device recited in claim 16, wherein the motion data includes data selected from the group consisting of: accelerometer data, gyroscopic data, and global positioning system (GPS) data.

18. The mobile computing device recited in claim 14, wherein the plurality of first coordinate points are determined at least in part via depth sensor data captured from a depth sensor at the mobile computing device.

19. The mobile computing device recited in claim 14, generating a multiview interactive digital media representation (MVIDMR) that includes the second set of images, the MVIDMR being navigable in one or more dimensions.

20. One or more non-transitory computer readable media having instructions stored thereon for performing a method comprising:
  determining a plurality of first coordinate points associated with a first set of images captured by a mobile computing device as the mobile computing device moved along a path through space around an object, wherein movement along the path is subject to variation along the path, each of the first coordinate points identifying a respective location in Cartesian coordinate space;
  converting the plurality of first coordinate points to second coordinate points, each of the second coordinate points identifying a respective location in polar coordinate space, wherein the polar coordinate space is defined relative to a center point corresponding to a location of the object;
  determining a first trajectory to remove variation along the path by smoothing the first trajectory through the polar coordinate space based on the second coordinate points, wherein smoothing comprises smoothing of radial coordinates of the mobile computing device in the polar coordinate space to reduce variation in radial distance from the object and reducing rotational position changes between images in the first set of images captured by the mobile computing device by evaluating a plurality of loss functions including a first loss function identifying a first difference between a first image's original rotational position and the first image's updated rotational position and a second loss function identifying a difference between a previous image's updated rotational position and a current image's updated rotational position;

determining a second trajectory through the Cartesian coordinate space based on the first trajectory through the polar coordinate space; and determining a second set of images based on the first set of images and the second trajectory, one or more of the second set of images being determined by transforming one or more of the first set of images to match a respective viewpoint associated with the second trajectory, the second set of images having a smoothed trajectory.

* * * * *